United States Patent
Wang et al.

(10) Patent No.: US 10,782,898 B2
(45) Date of Patent: *Sep. 22, 2020

(54) DATA STORAGE SYSTEM, LOAD REBALANCING METHOD THEREOF AND ACCESS CONTROL METHOD THEREOF

(71) Applicant: SurCloud Corp., Union City, CA (US)

(72) Inventors: Donglin Wang, Beijing (CN); Youbing Jin, Beijing (CN); Zhonghua Mo, Beijing (CN)

(73) Assignee: SURCLOUD CORP., Union City, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/139,712

(22) Filed: Sep. 24, 2018

(65) Prior Publication Data
US 2019/0026039 A1    Jan. 24, 2019

Related U.S. Application Data

(63) Continuation-in-part of application No. 16/054,536, filed on Aug. 3, 2018, and a continuation-in-part of (Continued)

(30) Foreign Application Priority Data

Feb. 3, 2016   (CN) .......................... 2016 1 0076422
Mar. 23, 2016   (CN) .......................... 2016 1 0173783
(Continued)

(51) Int. Cl.
*G06F 3/06*   (2006.01)
*G06F 12/02*   (2006.01)

(52) U.S. Cl.
CPC ............ *G06F 3/0631* (2013.01); *G06F 3/061* (2013.01); *G06F 3/067* (2013.01); *G06F 3/0614* (2013.01);
(Continued)

(58) Field of Classification Search
CPC ........ G06F 3/0631; G06F 12/02; G06F 3/061; G06F 3/0635; G06F 3/0653;
(Continued)

(56) References Cited

U.S. PATENT DOCUMENTS

2003/0187927 A1 * 10/2003 Winchell ............ G06F 11/1492
                                                           709/204
2004/0158673 A1 * 8/2004 Matsunami ............. G06F 3/067
                                                           711/114
(Continued)

*Primary Examiner* — Tasnima Matin
(74) *Attorney, Agent, or Firm* — Flener IP & Business Law; Zareefa B. Flener

(57) ABSTRACT

The embodiments of the present invention relate to a storage system comprising: a storage network; at least two storage nodes, connected to the storage network; and at least one storage device, connected to the storage network, each storage device comprising at least one storage medium; wherein, the storage network is configured to enable each of the at least two storage nodes to access any of the at least one storage medium without passing through another storage node of the at least two storage nodes. According to the embodiments of the present invention, a storage system in which there is no need to physically migrate data when rebalancing is required is provided.

17 Claims, 10 Drawing Sheets

Related U.S. Application Data application No. PCT/CN2017/077755, filed on Mar. 22, 2017, and a continuation-in-part of application No. PCT/CN2017/077757, filed on Mar. 22, 2017, and a continuation-in-part of application No. PCT/CN2017/077754, filed on Mar. 22, 2017, and a continuation-in-part of application No. PCT/CN2017/077758, filed on Mar. 22, 2017, and a continuation-in-part of application No. PCT/CN2017/077753, filed on Mar. 22, 2017, and a continuation-in-part of application No. PCT/CN2017/077751, filed on Mar. 22, 2017, and a continuation-in-part of application No. PCT/CN2017/071830, filed on Jan. 20, 2017.

(30) Foreign Application Priority Data

| | | |
|---|---|---|
| Mar. 23, 2016 | (CN) | 2016 1 0173784 |
| Mar. 24, 2016 | (CN) | 2016 1 0173007 |
| Mar. 24, 2016 | (CN) | 2016 1 0176288 |
| Mar. 25, 2016 | (CN) | 2016 1 0180244 |
| Mar. 26, 2016 | (CN) | 2016 1 0181228 |

(52) U.S. Cl.
CPC .......... *G06F 3/0635* (2013.01); *G06F 3/0653* (2013.01); *G06F 3/0689* (2013.01); *G06F 12/02* (2013.01); *G06F 2206/1012* (2013.01)

(58) Field of Classification Search
CPC ...... G06F 3/0689; G06F 3/067; G06F 3/0614; G06F 2206/1012
See application file for complete search history.

(56) References Cited

U.S. PATENT DOCUMENTS

| | | | |
|---|---|---|---|
| 2004/0213395 A1* | 10/2004 | Ishii | H04L 41/0896 379/201.01 |
| 2015/0127975 A1* | 5/2015 | Patterson | G06F 11/1076 714/15 |
| 2015/0370494 A1* | 12/2015 | Wang | G06F 3/0619 711/114 |
| 2019/0235777 A1* | 8/2019 | Wang | G06F 3/0619 |

* cited by examiner

DATA STORAGE SYSTEM, LOAD REBALANCING METHOD THEREOF AND ACCESS CONTROL METHOD THEREOF

CROSS-REFERENCE TO RELATED APPLICATIONS

This application is a Continuation-In-Part application of U.S. application Ser. No. 16/054,536, filed on Aug. 3, 2018 which is a Continuation-In-Part application of PCT application No. PCT/CN2017/071830, filed on Jan. 20, 2017 which claims priority to CN Patent Application No. 201610076422.6, filed on Feb. 3, 2016. This application is also a Continuation-In-Part application of PCT application No. PCT/CN2017/077758, filed on Mar. 22, 2017 which claims priority to CN Patent Application No. 201610173784.7, filed on Mar. 23, 2016. This application is also a Continuation-In-Part application of PCT application No. PCT/CN2017/077757, filed on Mar. 22, 2017 which claims priority to CN Patent Application No. 201610173783.2, filed on Mar. 23, 2016. This application is also a Continuation-In-Part application of PCT application No. PCT/CN2017/077755, filed on Mar. 22, 2017 which claims priority to CN Patent Application No. 201610181228.4, filed on Mar. 26, 2016. This application is also a Continuation-In-Part application of PCT application No. PCT/CN2017/077754, filed on Mar. 22, 2017 which claims priority to CN Patent Application No. 201610176288.7, filed on Mar. 24, 2016. This application is also a Continuation-In-Part application of PCT application No. PCT/CN2017/077753, filed on Mar. 22, 2017 which claims priority to CN Patent Application No. 201610173007.2, filed on Mar. 24, 2016. This application is also a Continuation-In-Part application of PCT application No. PCT/CN2017/077751, filed on Mar. 22, 2017 which claims priority to CN Patent Application No. 201610180244.1, filed on Mar. 25, 2016. All of the aforementioned applications are hereby incorporated by reference in their entireties.

TECHNICAL FIELD

Embodiments of the present invention relate to the technical field of data storage systems, and more specifically, to a storage system, load rebalancing method thereof and access control method thereof.

BACKGROUND

With increasing scale of computer applications, a demand for storage space is also growing. Accordingly, integrating storage resources of multiple devices (e.g., storage mediums of disk groups) as a storage pool to provide storage services has become a current mainstream. A conventional distributed storage system is usually composed of a plurality of storage nodes connected by a TCP/IP network. FIG. 1 shows an architectural schematic diagram of a conventional storage system provided by prior art. As shown in FIG. 1, in a conventional storage system, each storage node S is connected to a TCP/IP network via an access network switch. Each storage node is a separate physical server, and each server has its own storage mediums. These storage nodes are connected with each other through a storage network, such as an IP network, to form a storage pool.

On the other side, each computing node is also connected to the TCP/IP network via the access network switch, to access the entire storage pool through the TCP/IP network. Access efficiency in this way is low.

However, what is more important is that, in the conventional storage system, once rebalancing is required, data of the storage nodes have to be physically migrated.

SUMMARY

In view of this, the embodiments of the present invention aim at providing a storage system in which there is no need to physically migrate data when the rebalancing is required.

According to an embodiment of the present invention, a storage system is provided. The storage system including:
a storage network;
at least two storage nodes, connected to the storage network; and
at least one storage device, connected to the storage network, each of the at least one storage device including at least one storage medium;
wherein, the storage network is configured to enable each storage node to access any of the at least one storage mediums without passing through other storage node.

All the storage mediums included in the storage system constitute a storage pool which is divided into at least two storage areas, and each of the storage nodes is responsible for managing zero to multiple of the at least two storage areas.

One of the at least two storage areas is chosen as a global arbitration disk.

Each of the storage areas comprises at least two storage blocks, and the at least two storage blocks constituting a storage area are divided into one or more storage groups, data is stored in the redundant storage mode between the storage blocks within a storage group, and a storage block is a complete storage medium or a part of a storage medium.

The storage system comprises at least two storage devices connected to the storage network, wherein, data is saved in a redundant storage mode between at least one storage block of each of the at least two storage devices accessed by the same storage node, and the storage block is one complete storage medium or a part of one storage medium.

The storage network is an SAS storage network or PCI/e storage network or Infiniband storage network or Omni-Path network, the storage network comprising at least one SAS switch or PCI/e switch or Infiniband switch or Omni-Path switch; and each of the at least one storage device has SAS interface or PCI/e interface or Infiniband interface or Omni-Path interface.

The storage medium comprises at least one high performance storage medium and at least one persistent storage medium; all or a part of one or more high performance storage mediums of the at least one high performance storage mediums constitute a high cache area; and when data is written by the storage node, the data is first written into the high cache area, and then the data in the high cache area is written into the persistent storage medium by the same or another storage node.

Another aspect of an embodiment of the present invention provides a load rebalancing method for the storage system, comprising: monitoring a load status between the at least two storage nodes; and when it is detected that load of one storage node exceeds a predetermined threshold, adjusting the storage areas managed by the relevant storage node of the at least two storage nodes.

Another aspect of an embodiment of the present invention provides an access control method for the storage system, comprising: detecting whether any of the at least two storage nodes fails; and when it is detected that one of the storage nodes fails, the other storage nodes of the at least two storage nodes are configured such that the storage areas previously managed by the failed storage node are taken over by the other storage nodes.

The storage system provided by the embodiments of the present invention provides a storage pool that supports multi-nodes control and global access, has excellent scalability and high availability, can achieve large capacity by increasing the number of the storage mediums, and improves reliability against a single point of failure in the storage nodes.

DETAILED DESCRIPTION

The present invention will be described more fully hereinafter with reference to the accompanying drawings, in which the embodiments of the present invention are shown. These embodiments can, however, be embodied in many different forms and should not be construed as being limited to the embodiments set forth herein. Rather, these embodiments are provided so that the present invention is thorough and complete, and fully convey scope of the present invention to those skilled in the art.

The various embodiments of the present invention are described in detail in the following examples by combining with the accompanying drawings.

Figure 2:
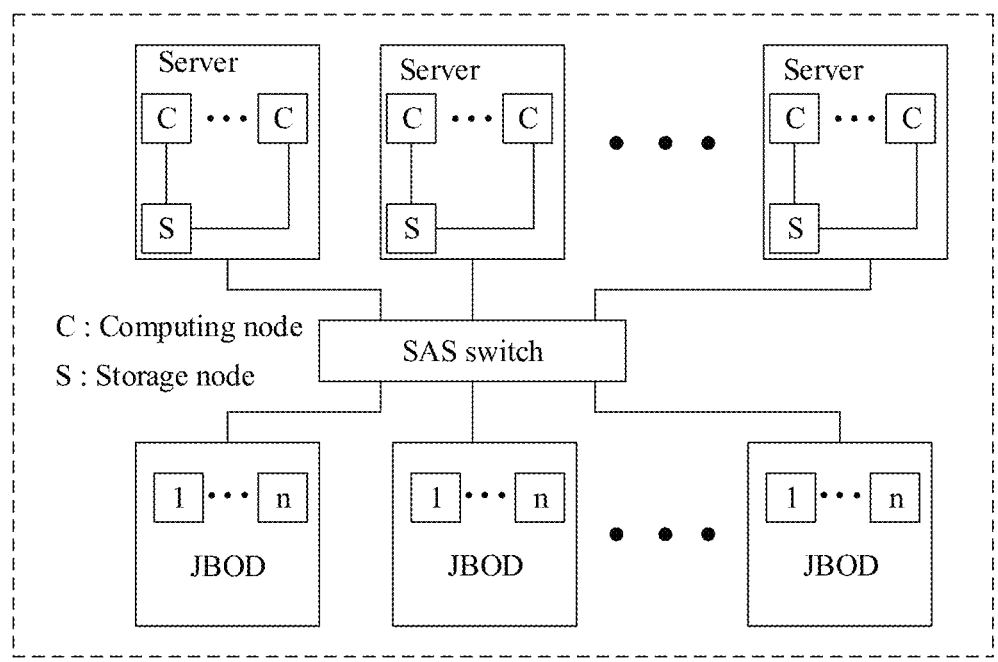
FIG. 2 shows an architectural schematic diagram of a storage system according to an embodiment of the present invention.

FIG. 2 shows an architectural schematic diagram of a storage system according to an embodiment of the present invention. As shown in FIG. 2, the storage system includes a storage network; storage nodes connected to the storage network, wherein the storage node is a software module that provides a storage service, instead of a hardware server including storage mediums in the usual sense, the storage node in the description of the subsequent embodiments also refers to the same concept, and will not be described again; and storage devices also connected to the storage network. Each storage device includes at least one storage medium. For example, a storage device commonly used by the inventor may include 45 storage mediums. The storage network is configured to enable each storage node to access any of the storage mediums without passing through other storage node. A storage management software is run by a storage node, the storage management software run by all storage nodes consist of a distributed storage management software.

The storage network may be an SAS storage network or PCI/e storage network or Infiniband storage network or Omni-Path network, the storage network may comprise at least one SAS switch or PCI/e switch or Infiniband switch or Omni-Path switch; and each of the storage device may have SAS interface or PCI/e interface or Infiniband interface or Omni-Path interface.

Figure 3:
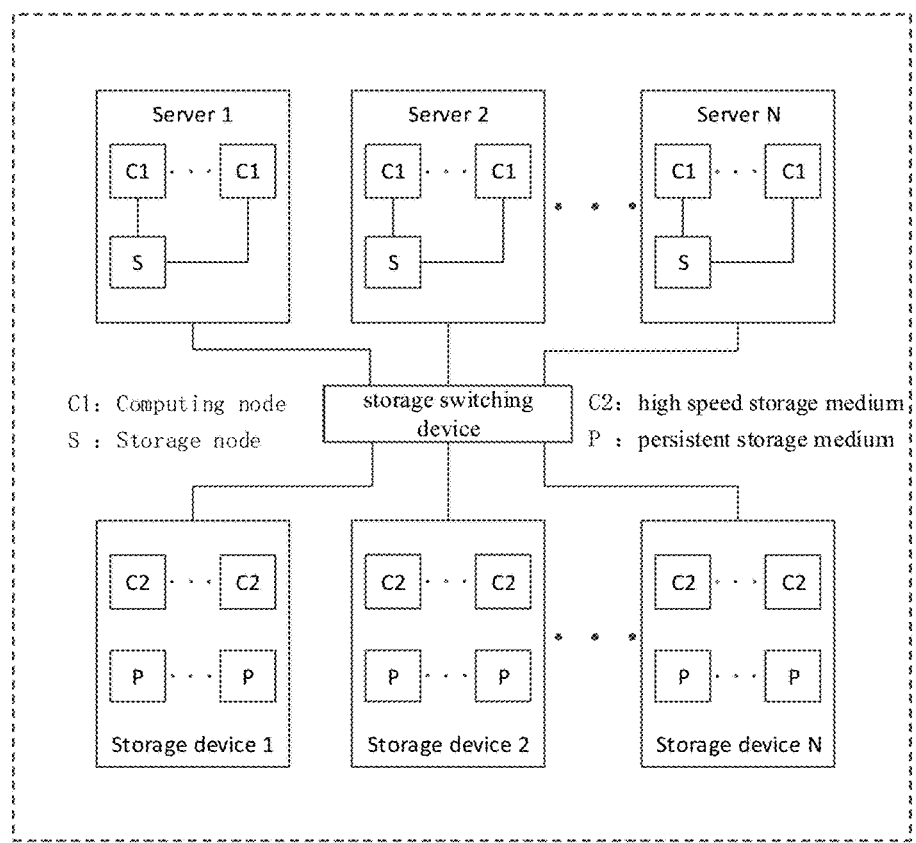
FIG. 3 shows an architectural schematic diagram of a storage system according to another embodiment of the present invention.

FIG. 3 shows an architectural schematic diagram of a storage system according to another embodiment of the present invention.

In an embodiment of the present invention, as shown in FIG. 3, each storage device includes at least one high performance storage medium and at least one persistent storage medium. All or a part of one or more high performance storage mediums of the at least one high performance storage medium constitutes a high cache area; when data is written by the storage node, the data is first written into the high cache area, and then the data in the high cache area is written into the persistent storage medium by the same or another storage node.

In an embodiment of the present invention, the storage node records the location of the persistent storage medium into which the data should ultimately be written in the high cache area while writing data into the high cache area; and then the same or another storage node write the data in the high cache area into the persistent storage medium in accordance to the location of the persistent storage medium into which the data should ultimately be written. After the data in the high cache area is written into the persistent storage medium, the corresponding data is cleared from the high cache area in time to release more space for new data to be written.

In an embodiment of the present invention, the location of the persistent storage medium into which each data should ultimately be written is not limited by the high performance storage medium in which the data is saved. For example, as shown in FIG. 3, some data may be cached in the high performance storage medium of the storage device 1, but the persistent storage medium into which the data should ultimately be written is located in the storage device 2.

In an embodiment of the present invention, the high cache area is divided into at least two cache units, each cache unit including one or more high performance storage mediums, or including part or all of one or more high performance storage mediums. And, the high performance storage mediums included in each cache unit are located in the same storage device or different storage devices.

For example, some cache unit may include two complete high performance storage mediums, a part of two high performance storage mediums, or a part of one high performance storage medium and one complete high performance storage medium.

In an embodiment of the present invention, each cache unit may be constituted by all or a part of at least two high performance storage mediums of at least two storage devices in a redundant storage mode.

In an embodiment of the present invention, each storage node is responsible for managing zero to multiple cache units. That is, some storage nodes may not be responsible for managing the cache unit at all, but are responsible for copying the data in the cache unit to the persistent storage medium. For example, in a storage system, there are 9 storage nodes, wherein the storage nodes N0.1 to 8 are responsible for writing data into its corresponding cache unit, and the storage node No. 9 is only used to write the data in the cache unit into the corresponding persistent storage medium (as described above, the address of the corresponding persistent storage medium is also recorded in the corresponding cache data). By using the above embodiments, some storage nodes can release more burden to perform other operations. In addition, a storage node dedicated to writing the cache data into persistent storage mediums can also write the cache data into persistent storage mediums in idle time, which greatly improves the efficiency of cache data transfer.

In an embodiment of the present invention, each storage node can only read and write cache units managed by itself. Since multiple storage nodes are prone to conflict with each other when writing into one high performance storage medium at the same time, but do not conflict with each other when reading, therefore, in another embodiment, each storage node can only make data to be cached be written into the cache unit managed by itself, but can read all the cache units managed by itself and other storage nodes, that is, writing operation of the storage node to the cache unit is local, and reading operation may be global.

In an embodiment of the present invention, when it is detected that a storage node fails, other or all of the storage nodes may be configured such that these storage nodes take over the cache units previously managed by the failed storage node. For example, all the cache units managed by the failed storage node may be taken over by one of the other storage nodes, and may also be taken over by at least two of the other storage nodes, each of which takes over a part of the cache units managed by the failed storage node.

Specifically, the storage system provided by the embodiment of the present invention may further include a storage control node connected to the storage network, adapted for allocating cache units to storage nodes; or a storage allocation module set in the storage node, adapted for determining the cache units managed by the storage node. When cache units managed by a storage node are changed, a cache unit list in which cache units managed by each storage node can be recorded maintained by the storage control node or the storage allocation module may also be changed correspondingly; that is, cache units managed by each storage node are modified by modifying the cache unit list in which cache units managed by each storage node can be recorded maintained by the storage control node or the storage allocation module.

In an embodiment of the present invention, when data is written into the high cache area, in addition to the data itself and the location of the persistent storage medium into which the data is to be written, the size information of the data needs to be written, and these three types of information are collectively referred to as a cache data block.

In an embodiment of the present invention, data written into the high cache area may be performed by the following manner. A head pointer and a tail pointer are respectively recorded in a fixed position of the cache unit first, and the head pointer and the tail pointer initially point to the beginning position of a blank area in the cache unit. When cache data is written, the head pointer increases the total size of the written cache data block, to point to the next blank area. When the cache data is cleared, size of the current cache data block and location of the persistent storage medium into which the data should be written are read from the position pointed by the tail pointer, the cache data of the size is written into the persistent storage medium at the specified location, and the tail pointer increases the size of the cleared cache data block, to point to the next cache data block and release the space of the cleared cache data. When the value of the head or tail pointer exceeds the available cached size, the pointer should be rewinded accordingly (that is, the available cached size is reduced to return to the front portion of the cache unit); the available cached size is that the size of the cache unit minus the size of the head pointer and the size of the tail pointer. When cache data is written, if the remaining space of the cache unit is smaller than the size of the cache data block (that is, the head pointer plus the size of the cache data block can catch up with the tail pointer), the existing cache data is cleared until there is enough cache space for writing cache data; if the available cache of the entire cache unit is smaller than the size of the cache database that needs to be written, the data is directly written into the persistent storage medium without caching; when the cache data is cleared, if the tail pointer is equal to the head pointer, the cache data is empty, and currently there is no cache data that needs to be cleared.

Based on the storage system provided by the embodiment of the present invention, all the storage areas of the storage node are located in the global high cache area, but not located in the memory of the physical server where the storage node is located or any other storage medium. The cache data written into the global high cache area can be shared by all storage nodes. In this case, work of writing the cache data into the persistent storage medium may be completed by each storage node, or one or more fixed storage nodes that are specifically responsible for the work are selected according to requirements. Such an implementation manner may improve balance of the load between different storage nodes.

In an embodiment of the present invention, the storage node is configured to write data to be cached into any one (or specified) high performance storage medium in the global cache pool, and the same or other storage nodes write the cache data that are written into the global cache pool into the specified persistent storage medium in the global cache pool one by one. Specifically, an application runs on the server where the storage node is located, such as on the computing node, in order to reduce the frequency of the application access to the persistent storage medium, each storage node temporarily saves the data commonly used by the application on the high performance storage medium. In this way, the application can read and write data directly from the high performance storage medium at runtime, thereby improving the running speed and performance of the application.

As a temporary data exchange area, in order to reduce the system load and improve the data transmission rate, in the conventional storage system, the cache area is usually integrated on each storage node of the cluster server, that is, reading and writing operations of the cache data are performed on each host of the cluster server. Each server temporarily puts the commonly used data in its own built-in cache area, and then transfers the data in the cache area to the persistent storage medium in the storage pool for permanent storage when the system is idle. Since the cache area has the characteristics that the storage content disappears after the power is turned off, if set in the server host, unpredictable risks may be brought to the storage system. Once any host in the cluster server fails, the cache data saved in this host will be lost, which will seriously affect the reliability and stability of the entire storage system.

In the embodiment of the present invention, the high cache area formed by the high performance storage mediums is set in the global storage pool independently of each host of the cluster server. In this manner, if a storage node in the cluster server fails, the cache data written by the node into the high performance storage medium is also not lost, which greatly enhances the reliability and stability of the storage system.

In the embodiment of the present invention, the storage system may further comprise at least two servers, each of the at least two servers may comprise one storage node and at least one computing node; the computing node may be able to access storage medium via storage node, storage network and storage device without TCP/IP protocol; and a computing node may be a virtual machine or a container.

Figure 4:
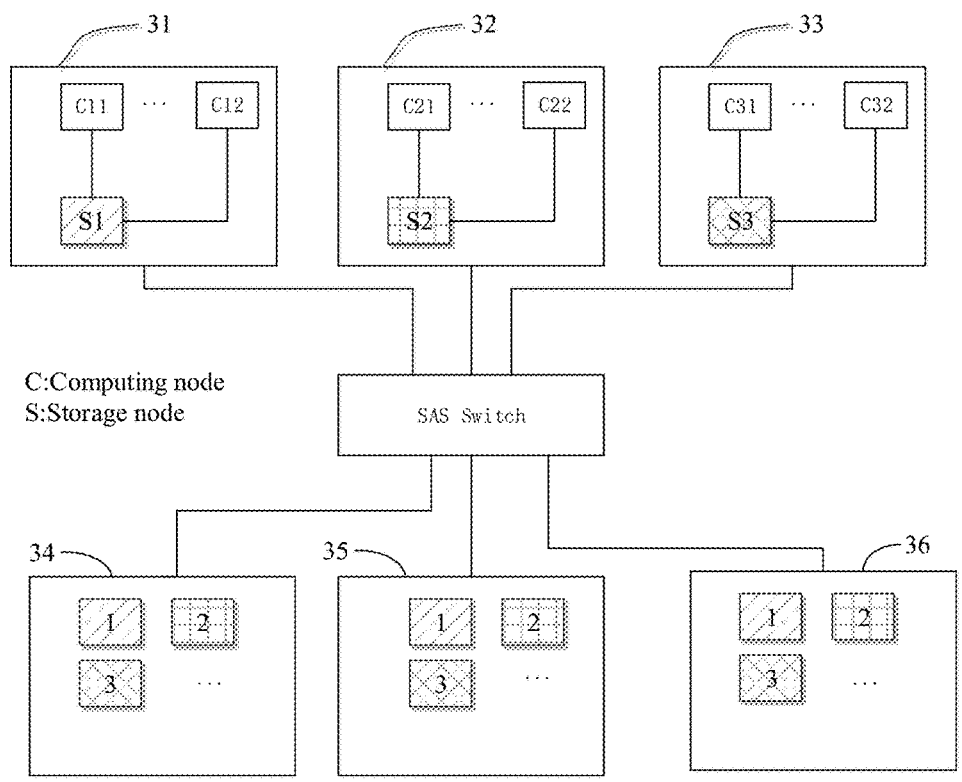
FIG. 4 shows an architectural schematic diagram of a particular storage system constructed according to an embodiment of the present invention.

FIG. 4 shows an architectural schematic diagram of a particular storage system constructed according to an embodiment of the present invention. The storage network is shown as an SAS switch in FIG. 4, but it should be understood that the storage network may also be an SAS collection, or other forms that will be discussed later. FIG. 4 schematically shows three storage nodes, namely a storage node S1, a storage node S2 and a storage node S3, which are respectively and directly connected to an SAS switch. The storage system shown in FIG. 4 includes physical servers 31, 32, and 33, which are respectively connected to storage devices through the storage network. The physical server 31 includes computing nodes C11, C12 and a storage node S1 that are located in the physical server 31, the physical server 32 includes computing nodes C21, C22 and a storage node S2 that are located in the physical server 32, and the physical server 33 includes computing nodes C31, C32 and a storage node S3 that are located in the physical server 33. The storage system shown in FIG. 4 includes storage devices 34, 35, and 36. The storage device 34 includes a storage medium 1, a storage medium 2, and a storage medium 3, which are located in the storage device 34, the storage device 35 includes a storage medium 1, a storage medium 2, and a storage medium 3, which are located in the storage device 35, and the storage device 36 includes a storage medium 1, a storage medium 2, and a storage medium 3, which are located in the storage device 36.

The storage network may be an SAS storage network, the SAS storage network may include at least one SAS switch, the storage system further includes at least one computing node, each storage node corresponds to one or more of the at least one computing node, and each storage device includes at least one storage medium having an SAS interface.

Figure 5:
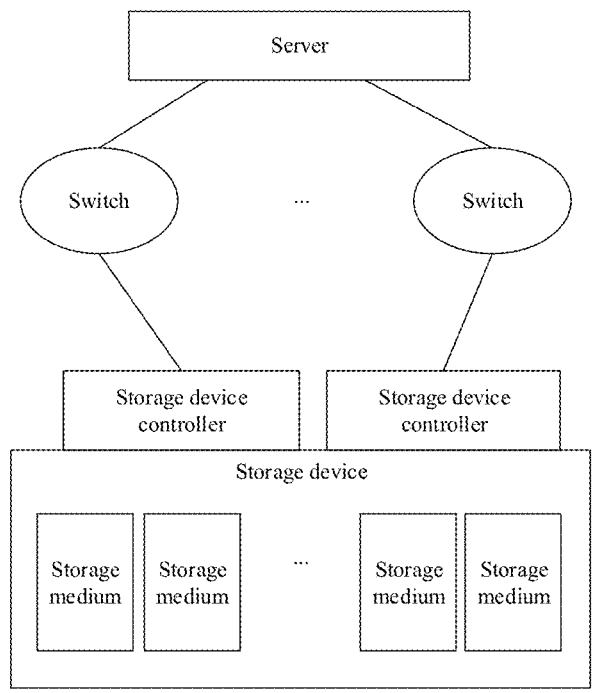
FIG. 5 shows an architectural schematic diagram of a conventional multi-path storage system provided by the prior art.

FIG. 5 shows an architectural schematic diagram of a conventional multi-path storage system provided by the prior art. As shown in FIG. 5, the conventional multi-path storage system is composed of a server, a plurality of switches, a plurality of storage device controllers, and a storage device, wherein the storage device is composed of at least one storage medium. Different interfaces of the server are respectively connected to different switches, and different switches are connected to different storage device controllers. In this way, when the server wants to access the storage medium in the storage device, the server first connects to a storage device controller through a switch, and then locates the specific storage medium through the storage device controller. When the access path fails, the server can connect to another storage device controller through another switch, and then locate the storage medium through the other storage device controller, thereby implementing multi-path switching. Since the path in the conventional multi-path storage system is built based on the IP address, the server is actually connected to the IP address of different storage device controllers through a plurality of different paths.

It can be seen that in the conventional multi-path storage system, the multi-path switching can only be implemented to the level of the storage device controller, and the multi-path switching cannot be implemented between the storage device controller and the specific storage medium. Therefore, the conventional multi-path storage system can only cope with the network failure between the server and the storage device controller, and cannot cope with a single point of failure of the storage device controller itself.

However, by using the SAS storage network built on SAS switches, the storage medium in the storage device is connected to the storage device through its SAS interface, and the storage node and the storage device are also connected to the SAS storage network through their respective SAS interfaces, so that the storage node can directly access a particular storage medium based on the SAS address of the storage medium. At the same time, since the SAS storage network is configured to enable each storage node access all storage mediums without passing through other storage nodes directly, all storage mediums in the storage devices constitute a global storage pool, and each storage node can read any storage medium in the global storage pool through the SAS switch. Thus multi-path switching is implemented between the storage nodes and the storage mediums.

Taking the SAS channel as an example, compared with a conventional storage solution based on an IP protocol, the storage network of the storage system based on the SAS switch has advantages of high performance, large bandwidth, a single device including a large number of disks and so on. When a host bus adapter (HBA) or an SAS interface on a server motherboard is used in combination, storage mediums provided by the SAS system can be easily accessed simultaneously by multiple connected servers.

Specifically, the SAS switch and the storage device are connected through an SAS cable, and the storage device and the storage medium are also connected by the SAS interface, for example, the SAS channel in the storage device is connected to each storage medium (an SAS switch chip may be set up inside the storage device), the SAS storage network can be directly connected to the storage mediums, which has unique advantages over existing multi-paths built on a FC network or Ethernet. Because the bandwidth of the SAS network can reach 24 Gb or 48 Gb, which is dozens of times the bandwidth of the Gigabit Ethernet, and several times the bandwidth of the expensive 10-Gigabit Ethernet; at the link layer, the SAS network has about an order of magnitude improvement over the IP network, and at the transport layer, a TCP connection is established with a three handshake and closed with a four handshake, so the overhead is high, and Delayed Acknowledgement mechanism and Slow Start mechanism of the TCP protocol may cause a 100-millisecond-level delay, while the delay caused by the SAS protocol is only a few tenths of that of the TCP protocol, so there is a greater improvement in performance. In summary, the SAS network offers significant advantages in terms of bandwidth and delay over the Ethernet-based TCP/IP network. Those skilled in the art can understand that the performance of the PCI/e channel can also be adapted to meet the needs of the system.

Based on the structure of the storage system, since the storage node is set to be independent of the storage device, that is, the storage medium is not located within the storage node, and the SAS storage network is configured to enable each storage node to access all storage mediums without passing through other storage nodes directly, and therefore, each computing node can be connected to each storage medium of the at least one storage device through any storage node. Thus multi-path access by the same computing node through different storage nodes is implemented. Each storage node in the formed storage system architecture has a standby node, which can effectively cope with a single point of failure of the storage node, and the path switching process may be completed immediately after the single point of failure, and there is no switching takeover time for the failure tolerance.

Therefore, based on the storage system structure shown in FIG. 2, an embodiment of the present invention further provides an access control method for the storage system, including: when any one of the storage nodes fails, making a computing node connected to the failure storage node read and write storage mediums through other storage nodes. Thus, when a single point of failure of a storage node occurs, the computing node connected to the failed storage node may implement multi-path access through other storage nodes.

In an embodiment of the present invention, the physical server where each storage node is located has at least one SAS interface, and the at least one SAS interface of the physical server where each storage node is located is respectively connected to at least one SAS switch; each storage device has at least one SAS interface, the at least one SAS interface of each storage device is respectively connected to at least one SAS switch. In this way, each storage node can access the storage medium through at least one SAS path. The SAS path is composed of any SAS interface of the physical server where the storage node currently performing access is located, an SAS switch corresponding to the any SAS interface, an SAS interface of the storage device to be accessed, and an SAS interface of the storage medium to be accessed.

It can be seen that the same computing node may access the storage medium through at least one SAS path of the same storage node, in addition to multi-path access through different storage nodes. When a storage node has multiple SAS paths accessing the storage medium, the computing node may implement multi-path access through multiple SAS paths of the storage node. Therefore, in summary, each computing node may access the storage medium through at least two access paths, wherein at least two access paths include different SAS paths of the same storage node, or any SAS path of each of different storage nodes.

Figure 6:
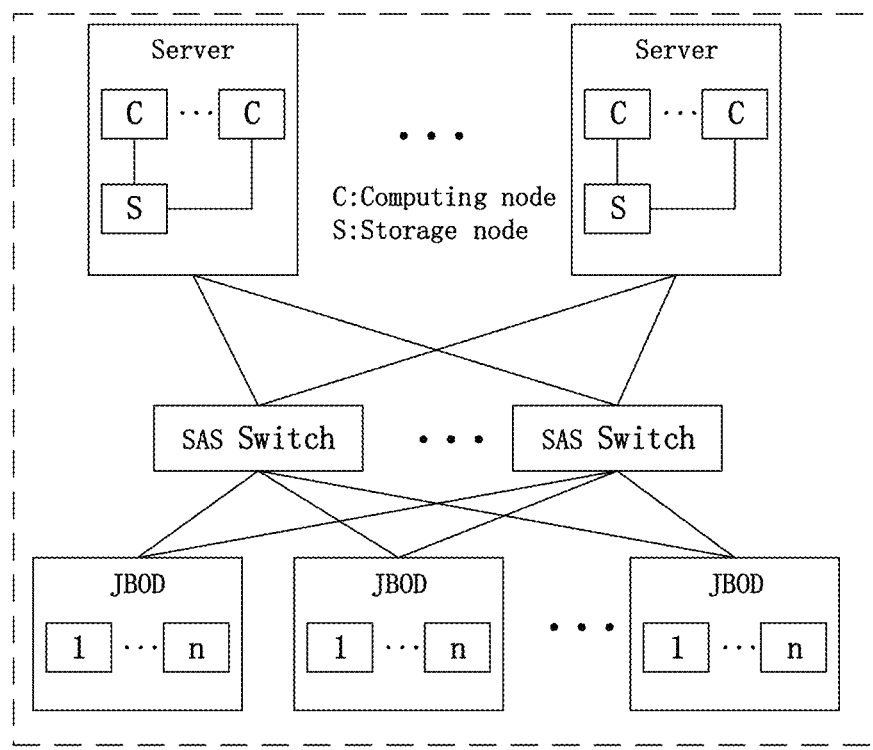
FIG. 6 shows an architectural schematic diagram of a storage system according to another embodiment of the present invention.

FIG. 6 shows an architectural schematic diagram of a storage system according to another embodiment of the present invention. As shown in FIG. 6, unlike the storage system shown in FIG. 2, the storage system includes at least two SAS switches; the physical server where each storage node is located has at least two SAS interfaces, and the at least two SAS interfaces of the physical server where each storage node is located are respectively connected to at least two SAS switches; each storage device has at least two SAS interfaces, and the at least two SAS interfaces of each storage device are respectively connected to the at least two SAS switches. Therefore, each of the at least two storage nodes may access the storage medium through at least two SAS paths, each of the at least two SAS paths corresponds to a different SAS interface of the physical server where the storage node is located, and the different SAS interface corresponds to a different SAS switch. And, since each storage device has at least two SAS interfaces, the storage medium in each storage device is constant, therefore, different SAS interfaces of the same storage device are connected to the same storage medium through different lines.

It can be seen that, based on the storage system structure shown in FIG. 6, on the access path of the computing node accessing the storage medium, any one of the storage node and the SAS switch has a standby node for switching when a single point of failure, which can effectively cope with a single point of failure for any node in any access path. Therefore, based on the storage system structure as shown in FIG. 6, an embodiment of the present invention further provides an access control method for the storage system, including: when any one of the SAS paths fails, making the storage node connected to the failed SAS path read and write the storage medium by the other SAS path, wherein the SAS path is composed of any SAS interface of the physical server where the storage node currently performing access is located, an SAS switch corresponding to the any SAS interface, an SAS interface of the storage device to be accessed, and an SAS interface of the storage medium to be accessed.

It should be understood that when the SAS storage network includes multiple SAS switches, different storage nodes may still perform multi-path access to the storage medium based on the same SAS switch, that is, when any one storage node fails, the computing node connected to the failed storage node may read and write the storage medium through other storage nodes but based on the same SAS switch.

In an embodiment of the present invention, since each storage medium in the SAS storage network has an SAS address, when a storage node is connected to a storage medium in a storage device through any one of the SAS switches, the SAS address of the storage device to be connected in the SAS storage network may be used to locate the location of the storage medium to be connected. In a further embodiment, the SAS address may be a globally unique WWN (World Wide Name) code.

Figure 1:
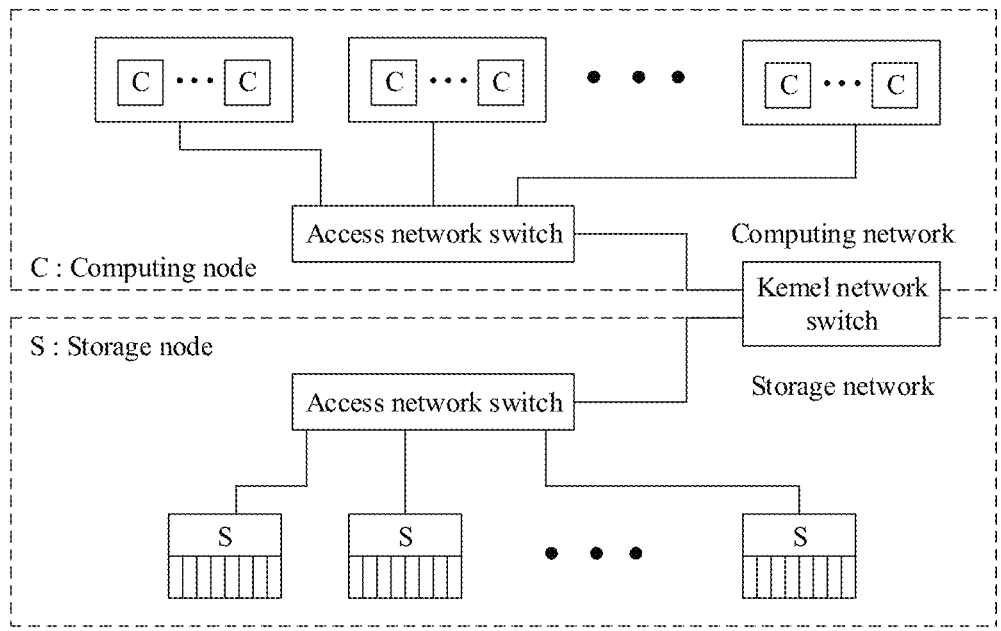
FIG. 1 shows an architectural schematic diagram of a conventional storage system provided by prior art.

As shown in FIG. 1, in the existing conventional storage system structure, the storage node is located in the storage-medium-side, or strictly speaking, the storage medium is a built-in disk of a physical device where the storage node is located. In the storage system provided by the embodiment of the present invention, the physical device where the storage node is located is independent of the storage device, and each storage node and one computing node are set in the same physical server, and the physical server is connected to the storage device through the SAS storage network. The storage node may directly access the storage medium through the SAS storage network, so the storage device is mainly used as a channel to connect the storage medium and the storage network.

By using the converged storage system in which the computing node and the storage node are located in same physical device provided by the embodiments of the present invention, the number of physical devices required can be reduced from the point of view of whole system, and thereby the cost is reduced. And, the computing node can locally access any storage resource that they want to access. In addition, since the computing node and the storage node are converged in same physical server, data exchanging between the two can be as simple as memory sharing or API call, so the performance is particularly excellent.

In an embodiment of the present invention, each storage node and its corresponding computing node are both located in the same server, and the physical server is connected to the storage device through the storage switching device.

In an embodiment of the present invention, each storage node accesses at least two storage devices through a storage network, and data is saved in a redundant storage mode between at least one storage block of each of the at least two storage devices accessed by the same storage node, wherein the storage block is one complete storage medium or a part of one storage medium. It can be seen that since the data is saved in the storage blocks of different storage devices in a redundant storage mode, and thus the storage system is a redundant storage system.

In the conventional redundant storage system as shown in FIG. 1, the storage node is located in the storage-medium-side, the storage medium is a built-in disk of a physical device where the storage node is located, the storage node is equivalent to a control machine of all storage mediums in the local physical device, the storage node and all the storage mediums in the local physical device constitute a storage device. Although disaster recovery processing can be implemented by means of redundant storage between the disks mounted on each storage node S, when a storage node S fails, the disks mounted under the storage node may no longer be read or written, and restoring the data in the disks mounted by the failed storage node S may seriously affect the working efficiency of the entire redundant storage system.

However, in the embodiment of the present invention, the physical device where the storage node is located is independent of the storage device, the storage device is mainly used as a channel to connect the storage medium and the storage network, the storage node and the storage device are respectively connected to the storage network independently, each storage node may access multiple storage devices through the storage network, and the multiple storage devices accessed by the same storage node are redundantly saved, and thus this enables redundant storage across storage devices under the same storage node. In this way, even if a storage device fails, the data in the storage device may be quickly resaved through other normal working storage devices, which greatly improves the disaster recovery processing efficiency of the entire storage system.

In the storage system provided by the embodiments of the present invention, each storage node may access all the storage mediums without passing through other storage node, so that all the storage mediums are actually shared by all the storage nodes, and therefore a global storage pool is achieved.

Further, the storage network is configured to make each of the storage node only be responsible for managing a fixed storage medium at the same time, and ensure that one storage medium is not written by multiple storage nodes at the same time, which may result in data corruption, and thereby it may be implemented that each storage node may access to the storage mediums managed by itself without passing through other storage nodes, and the integrity of the data saved in the storage system may be guaranteed. In addition, the constructed storage pool may be divided into at least two storage areas, and each storage node is responsible for managing zero to multiple storage areas. Referring to FIG. 4, which use different background patterns to schematically show a situation in which a storage area is managed by a storage node, wherein a storage medium included in the same storage area and a storage node responsible for managing it are represented by the same background pattern. Specifically, the storage node S1 is responsible for managing the first storage area, which includes the storage medium 1 in the storage device 34, the storage medium 1 in the storage device 35, and the storage medium 1 in the storage device 36; the storage node S2 is responsible for managing the second storage area, which includes a storage medium 2 in the storage device 34, a storage medium 2 in the storage device 35, and a storage medium 2 in the storage device 36; the storage node S3 is responsible for managing the third storage area, which includes the storage medium 3 in the storage device 34, the storage medium 3 in the storage device 35, and the storage medium 3 in the storage device 36.

At the same time, compared with the prior art (the storage node is located in the storage-medium-side, or strictly speaking, the storage medium is a built-in disk of a physical device where the storage node is located); in the embodiments of the present invention, the physical device where the storage node is located, is independent of the storage device, and the storage device is mainly used as a channel to connect the storage medium to the storage network.

Figure 7:
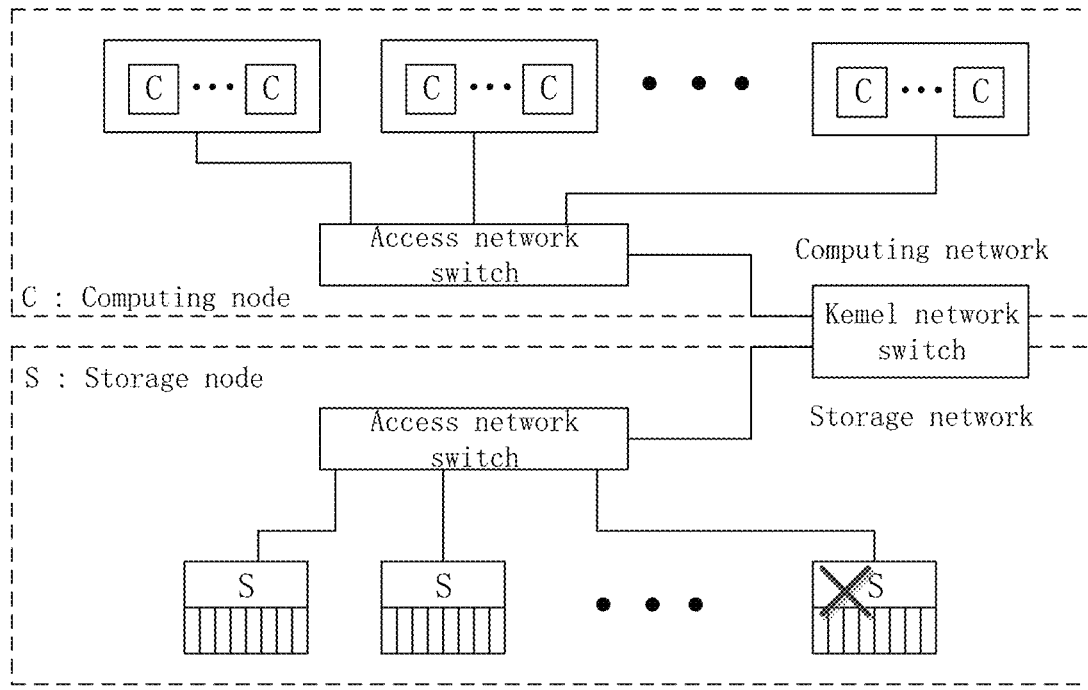
FIG. 7 shows a situation where a storage node fails in the storage system shown in FIG. 1.

In a conventional storage system, when a storage node fails, the disks mounted under the storage node may no longer be read or written, resulting in a decline in overall system performance. FIG. 7 shows a situation where a storage node fails in the storage system shown in FIG. 1, in which the disks mounted under the failed storage node may not be accessed. As shown in FIG. 7, when a storage node fails, the computing node C may no longer be able to access the data in the disks mounted and managed by the failed storage node. Although it is possible to calculate the data in the disks managed by the failed storage node from the data in the other disks by a multi-copy mode or a redundant array of independent disks (RAID) mode, but resulting in a decline in data access performance.

However, in the embodiment of the present invention, when a storage node fails, the storage areas managed by the failed storage node may not become invalid storage areas in the storage system, may still be accessed by other storage nodes, and administrative rights of the storage areas may be allocated to other storage nodes.

In the embodiments of the present invention, there is no need to physically migrate data between different storage mediums when the rebalancing (adjust the relationship between data and storage node) is required, as long as re-configure different storage nodes to balance data managed.

In another embodiment of the present invention, the storage-node-side further includes a computing node, and the computing node and the storage node are located in same physical server connected with the storage devices via the storage network.

In a storage system provided by an embodiment of the present invention, the I/O (input/output) data path between the computing node and the storage medium includes: (1) the path from the storage medium to the storage node via storage device and storage network; and (2) the path from the storage node to the computing node located in one same physical server. The full data path doesn't use TCP/IP protocol. However, in comparison, in the storage system provided by the prior art as shown in FIG. 1, the I/O data path between the computing node and the storage medium includes: (1) the path from the storage medium to the storage node; (2) the path from the storage node to the access network switch of the storage network; (3) the path from the access network switch of the storage network to the kernel network switch; (4) the path from the kernel network switch to the access network switch of the computing network; and (5) the path from the access network switch of the computing network to the computing node. It is apparent that the total data path of the storage system provided by the embodiments of the present invention is only close to item (1) of the conventional storage system. Therefore, the storage system provided by the embodiments of the present invention can greatly compress the data path, so that I/O channel performance of the storage system can be greatly improved, and the actual operation effect is very close to reading or writing an I/O channel of a local drive.

It should be understood that since the physical server where each computing node is located has a storage node, there is a network connection between the physical servers, therefore, the computing node in a physical server may also access the storage mediums through the storage node in another physical server. In this way, the same computing node may multi-path access the storage mediums through different storage nodes.

In an embodiment of the present invention, the storage node may be a virtual machine of a physical server, a container or a module running directly on a physical operating system of the server, or the combination of the above (For example, a part of the storage node is a firmware on an expansion card, another part is a module of a physical operating system, and another part is in a virtual machine), and the computing node may also be a virtual machine of the same physical server, a container, or a module running directly on a physical operating system of the server. In an embodiment of the present invention, each storage node may correspond to one or more computing nodes.

Specifically, one physical server may be divided into multiple virtual machines, wherein one of the virtual machines may be used as the storage node, and the other virtual machines may be used as the computing nodes; or, in order to achieve a better performance, one module on the physical OS (operating system) may be used as the storage node.

In an embodiment of the present invention, the virtual machine may be built through one of following virtualization technologies: KVM, Zen, VMware and Hyper-V, and the container may be built through one of following container technologies: Docker, Rockett, Odin, Chef, LXC, Vagrant, Ansible, Zone, Jail and Hyper-V.

In an embodiment of the present invention, the storage nodes are only responsible for managing corresponding storage mediums respectively at the same time, and one storage medium cannot be simultaneously written by multiple storage nodes, so that data conflicts can be avoided. As a result each storage node can access the storage mediums managed by itself without passing through other storage nodes, and integrity of the data saved in the storage system can be ensured.

In an embodiment of the present invention, all the storage mediums in the system may be divided according to a storage logic. Specifically, the storage pool of the entire system may be divided according to a logical storage hierarchy which includes storage areas, storage groups and storage blocks, wherein, the storage block is the smallest storage unit. In an embodiment of the present invention, the storage pool may be divided into at least two storage areas.

In an embodiment of the present invention, each storage area may be divided into at least one storage group. In a preferred embodiment, each storage area is divided into at least two storage groups.

In some embodiments of the present invention, the storage areas and the storage groups may be merged, so that one level may be omitted in the logical storage hierarchy.

In an embodiment of the present invention, each storage area (or storage group) may include at least one storage block, wherein the storage block may be one complete storage medium or a part of one storage medium. In order to build a redundant storage mode within the storage area, each storage area (or storage group) may include at least two storage blocks, when any one of the storage blocks fails, complete data saved can be calculated from the rest of the storage blocks in the storage area. The redundant storage mode may be a multi-copy mode, a redundant array of independent disks (RAID) mode, or an erasure code mode, or BCH (Bose-Chaudhuri-Hocquenghem) codes mode, or RC (Reed-Solomon) codes mode, or LDPC (low-density parity-check) codes mode, or a mode that adopts other error-correcting code. In an embodiment of the present invention, the redundant storage mode may be built through a ZFS (zettabyte file system). In an embodiment of the present invention, in order to deal with hardware failures of the storage devices/storage mediums, the storage blocks included in each storage area (or storage group) may not be located in one same storage medium, even not be located in one same storage device. In an embodiment of the present invention, any two storage blocks included in same storage area (or storage group) may not be located in one same storage medium, or even not located in one same storage device. In another embodiment of the present invention, in one storage area (or storage group), the number of the storage blocks located in same storage medium/storage device is preferably less than or equal to the fault tolerance level (the max number of failed storage blocks without losing data) of the redundant storage. For example, when the redundant storage applies RAID5, the fault tolerance level is 1, so in one storage area (or storage group), the number of the storage blocks located in same storage medium/storage device is at most 1; for RAID6, the fault tolerance level of the redundant storage mode is 2, so in one storage area (or storage group), the number of the storage blocks located in same storage medium/storage device is at most 2.

Since the storage blocks in the storage group are actually from different storage devices, the fault tolerance level of the storage pool is related to the fault tolerance level of the redundant storage in the storage group. Therefore, in an embodiment of the present invention, the storage system further includes a fault tolerance level adjustment module, adjusting the fault tolerance level of the storage pool by adjusting the redundant storage mode of a storage group and/or adjusting the maximum number of storage blocks that belong to same storage group and located in same storage devices of the storage pool. Specifically, if D is used to represent the number of storage blocks in the storage group that are allowed to fail simultaneously, N is used to represent the number of storage blocks from each of the at least two storage devices of the storage pool for aggregation into the same storage group, and M is used to represent the number of storage devices in the storage pool that are allowed to fail simultaneously. Then, the fault tolerance level of the storage pool determined by the fault tolerance level adjustment module is M=D/N, and the D/N only takes integer bits. In this way, different fault tolerance level of the storage system may be implemented according to actual needs.

In an embodiment of the present invention, each storage node can only read and write the storage areas managed by itself. In another embodiment of the present invention, since multiple storage nodes do not conflict with each other when read one same storage block but easily conflict with each other when writing one same storage block, each storage node can only write the storage areas managed by itself but can read the storage areas managed by itself and the storage areas managed by the other storage nodes. Thus it can be seen that writing operations are local, but reading operations are global.

In an embodiment of the present invention, the storage system may further include a storage control node, which is connected to the storage network and adapted for allocating storage areas to the at least two storage nodes. In another embodiment of the present invention, each storage node may include a storage allocation module, adapted for determining the storage areas managed by the storage node. The determining operation may be implemented through communication and coordination algorithms between the storage allocation modules included in each storage node, for example, the algorithms may be based on a principle of load balancing between the storage nodes.

In an embodiment of the present invention, when it is detected that a storage node fails, some or all of the other storage nodes may be configured to take over the storage areas previously managed by the failed storage node. For example, one of the other storage nodes may be configured to take over the storage areas previously managed by the failed storage node, or at least two of the other storage nodes may be configured to take over the storage areas previously managed by the failed storage node, wherein each storage node may be configured to take over a part of the storage areas previously managed by the failed storage node, for example the at least two of the other storage nodes may be configured to respectively take over different storage groups of the storage areas previously managed by the failed storage node. The takeover of the storage areas by the storage node is also described as migrating the storage areas to the storage node herein.

In an embodiment of the present invention, the storage medium may include but is not limited to a hard disk, a flash storage, a SRAM (static random access memory), a DRAM (dynamic random access memory), a NVME (non-volatile memory express) storage, a 3DXPoint storage, a NVRAM (Nonvolatile Random Access Memory) storage, or the like, and an access interface of the storage medium may include but is not limited to an SAS (serial attached SCSI) interface, a SATA (serial advanced technology attachment) interface, a PCI/e (peripheral component interface-express) interface, a DIMM (dual in-line memory module) interface, a NVMe (non-volatile memory express) interface, a SCSI (small computer systems interface), an ethernet interface, an infiniband interface, a omipath interface, or an AHCI (advanced host controller interface).

In an embodiment of the present invention, the storage medium may be a high performance storage medium or a persistent storage medium herein.

In an embodiment of the present invention, the storage network may include at least one storage switching device, and the storage nodes access the storage mediums through data exchanging between the storage switching devices. Specifically, the storage nodes and the storage mediums are respectively connected to the storage switching device through a storage channel. In accordance with an embodiment of the present invention, a storage system supporting multi-nodes control is provided, and a single storage space of the storage system can be accessed through multiple channels, such as by a computing node.

In an embodiment of the present invention, the storage switching device may be an SAS switch, an ethernet switch, an infiniband switch, an omnipath switch or a PCI/e switch, and correspondingly the storage channel may be an SAS (Serial Attached SCSI) channel, an ethernet channel, an infiniband channel, an omnipath channel or a PCI/e channel.

In an embodiment of the present invention, the storage network may include at least two storage switching devices, each of the storage nodes may be connected to any storage device through any storage switching device, and further connected with the storage mediums. When a storage switching device or a storage channel connected to a storage switching device fails, the storage nodes can read and write the data in the storage devices through the other storage switching devices, which enhances the reliability of data transfer in the storage system.

Figure 8:
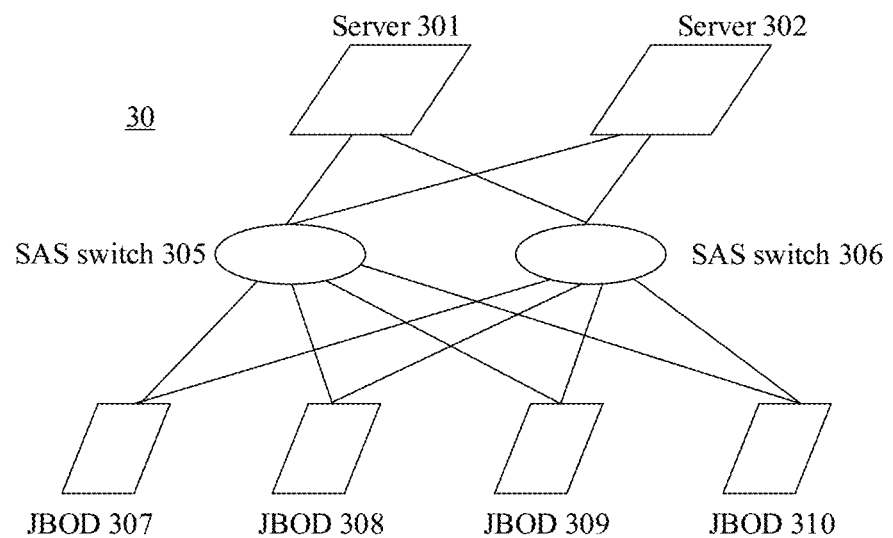
FIG. 8 shows an architectural schematic diagram of a particular storage system constructed according to an embodiment of the present invention.

FIG. 8 shows an architectural schematic diagram of a particular storage system constructed according to an embodiment of the present invention. A specific storage system 30 provided by an embodiment of the present invention is illustrated. The storage devices in the storage system 30 are constructed as multiple JBODs (Just a Bunch of Disks) 307-310, these JBODs are respectively connected with two SAS switches 305 and 306 via an SAS cables, and the two SAS switches constitute the switching core of the storage network included in the storage system. A front end includes at least two servers 301 and 302, and each of the servers is connected with the two SAS switches 305 and 306 through a HBA device (not shown) or an SAS interface on the motherboard. There is a basic network connection between the servers for monitoring and communication. Each of the servers has a storage node that manages some or all of the disks in all the JBODs. Specifically, the disks in the JBODs may be divided into different storage groups according to the storage areas, the storage groups, and the storage blocks described above. Each of the storage nodes manages one or more storage groups. When each of the storage groups applies the redundant storage mode, redundant storage metadata may be saved on the disks, so that the redundant storage mode may be directly identified from the disks by the other storage nodes.

Figure 9:
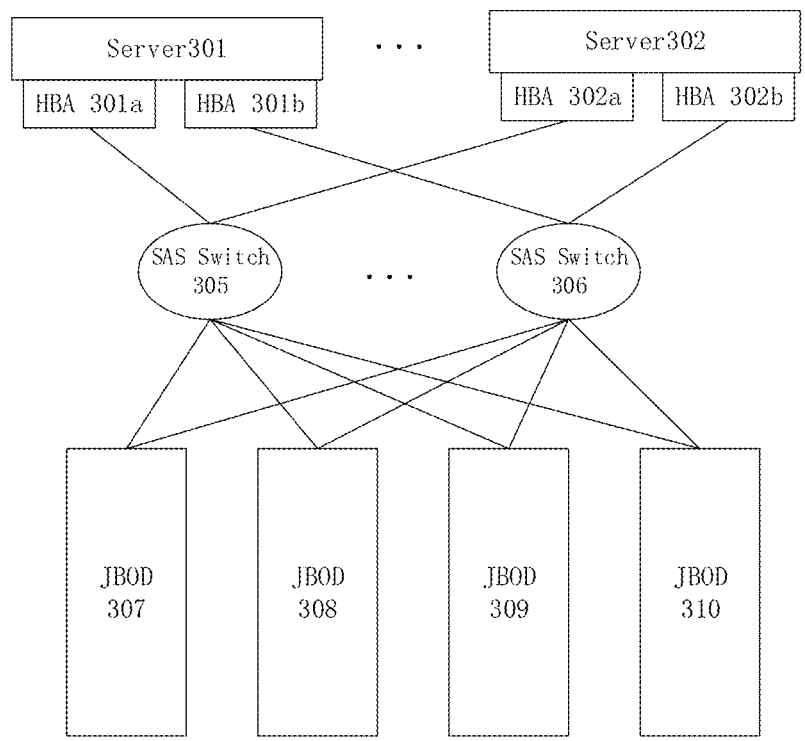
FIG. 9 shows an architectural schematic diagram of a storage system according to another embodiment of the present invention.

FIG. 9 shows an architectural schematic diagram of a storage system according to another embodiment of the present invention. As shown in FIG. 9, the storage device in the storage system 30 is constructed into a plurality of JBODs 307-310, which are respectively connected to two SAS switches 305 and 306 through a SAS data line, the two SAS switches constitute kernel switches of the SAS storage network included in the storage system, and front end includes at least two servers 301 and 302. The server 301 includes at least two adapters 301a and 301b, and the at least two adapters 301a and 301b are respectively connected to at least two SAS switches 305 and 306; the server 302 includes at least two adapters 302a and 302b, and the at least two adapters 302a and 302b are respectively connected to at least two SAS switches 305 and 306. Based on the storage system structure shown in FIG. 9, the access control method provided by an embodiment of the present invention may further include: when any adapter of a storage node fails, the storage node is connected to the corresponding SAS switch through another adapter. For example, when the adapter 302a of the server 302 fails, the server 302 may not be connected to the SAS switch 305 through the adapter 302a, and the server 302 may still be connected to the SAS switch 306 through the adapter 302b.

There is a basic network connection between the servers for monitoring and communication. Each server has a storage node that manages some or all of the disks in all JBOD disks by using information obtained from the SAS links.

Specifically, the disks in the JBODs may be divided into different storage groups according to the storage areas, the storage groups, and the storage blocks described above. Each of the storage nodes manage one or more storage groups. When each of the storage groups applies the redundant storage mode, redundant storage metadata may be saved on the disks, so that the redundant storage mode may be directly identified from the disks by the other storage nodes.

In the exemplary storage system 30, a monitoring and management module may be installed in the storage node to be responsible for monitoring status of local storage and the other server. When a JBOD is overall abnormal or a certain disk on a JBOD is abnormal, data reliability is ensured by the redundant storage mode. When a server fails, the monitoring and management module in the storage node of another pre-set server will identify locally and take over the disks previously managed by the storage node of the failed server, according to the data in the disks. The storage services previously provided by the storage node of the failed server will also be continued on the storage node of the new server. At this point, a new global storage pool structure with high availability is achieved.

It can be seen that the exemplary storage system 30 provides a storage pool that supports multi-nodes control and global access. In terms of hardware, multiple servers are used to provide the services for external user, and the JBODs are used to accommodate the disks. Each of the JBODs is respectively connected to two SAS switches, and the two switches are respectively connected to a HBA card of the servers, thereby ensuring that all the disks on the JBODs can be accessed by all the servers. SAS redundant links also ensure high availability on the links.

On the local side of each server, according to the redundant storage technology, disks are selected from each JBOD to form the redundant storage mode, to avoid the data unable to be accessed due to the failure of one JBOD. When a server fails, the module that monitors the overall state may schedule another server to access the disks managed by the storage node of the failed server through the SAS channels, to quickly take over the disks previously managed by the failed server and achieve the global storage pool with high availability.

Although it is illustrated as an example in FIG. 8 that the JBODs may be used to accommodate the disks, it should be understood that the embodiment of the present invention shown in FIG. 8 also may apply other storage devices than the JBODs. In addition, the above description is based on the case that one (entire) storage medium is used as one storage block, but also applies to the case that a part of one storage medium is used as one storage block.

An embodiment of the present invention further provides an access control apparatus for a storage system, wherein the storage system applied includes: an SAS storage network, including at least one SAS switch; at least two storage nodes, which are connected to the SAS storage network; at least one storage device, which is connected to the SAS storage network; and at least one computing node, each storage node corresponding to one or more computing nodes of the at least one computing node, wherein, each storage device includes at least one storage medium with an SAS interface, the SAS storage network being configured to enable each storage node directly access to all the storage mediums without passing through other storage nodes; the apparatus includes: an access path switching module, adapted for when any one of the storage nodes fails, making a computing node connected to the failure storage node read and write storage mediums through other storage nodes.

In an embodiment of the present invention, the SAS storage network includes at least two SAS switches; the physical server where each storage node is located has at least two SAS interfaces, and the at least two SAS interfaces of the physical server where each storage node is located are respectively connected to at least two SAS switches; each storage device has at least two SAS interfaces, and the at least two SAS interfaces of each storage device are respectively connected to the at least two SAS switches; the access path switching module can also be adapted for when any one of the SAS paths fails, making the storage node connected to the failed SAS path read and write the storage medium by the other SAS path; wherein the SAS path is composed of any SAS interface of the physical server where the storage node currently performing access is located, an SAS switch corresponding to the any SAS interface, an SAS interface of the storage device to be accessed, and an SAS interface of the storage medium to be accessed.

Figure 10:
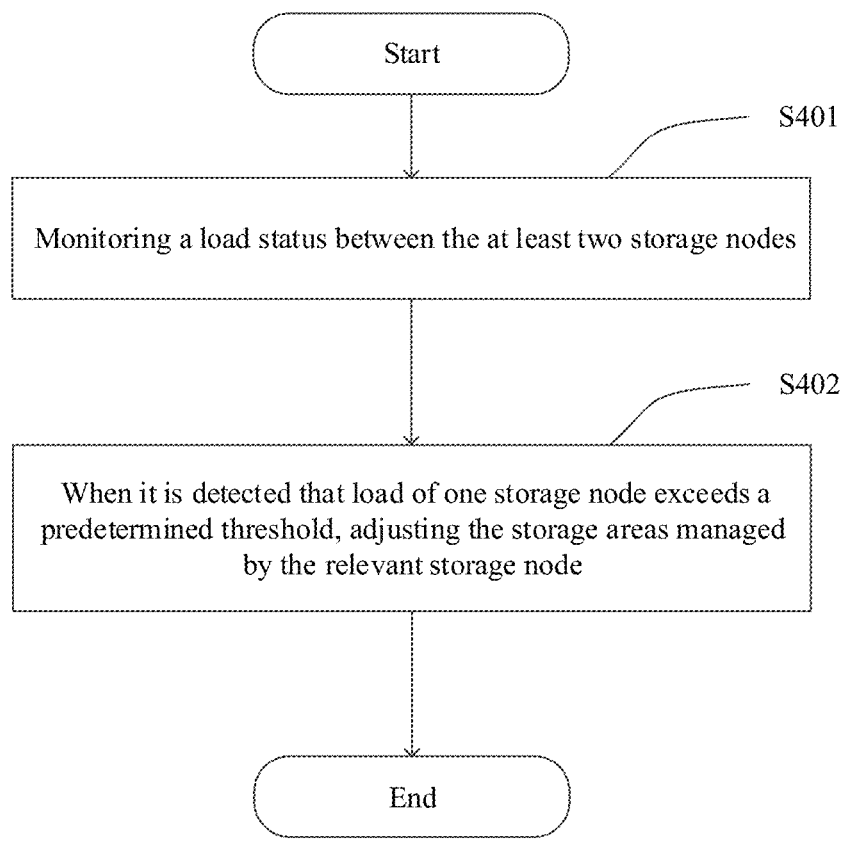
FIG. 10 shows a flowchart of an access control method for an exemplary storage system according to an embodiment of the present invention.

FIG. 10 shows a flowchart of an access control method 41 for an exemplary storage system according to an embodiment of the present invention.

In step S401, monitoring a load status between at least two storage nodes included in the storage system.

In step S402, when it is detected that load of one storage node exceeds a predetermined threshold, the storage area managed by the relevant storage node of the at least two storage nodes is adjusted. The relevant storage node may be a storage node that causes an unbalanced state of the load, and may be determined depending on an adjustment policy of the storage area. The adjustment of the storage area may be that the storage blocks involved are reallocated between the storage nodes, or may be addition, merging, or deletion of the storage areas. The configuration table of the storage area managed by the relevant storage node may be adjusted, and the at least two storage nodes determine the storage area they manage according to the configuration table. The adjustment of the foregoing configuration table may be performed by a storage control node included in the foregoing storage system or a storage allocation module included in the storage node.

In an embodiment, monitoring a load status between the at least two storage nodes may be performed for one or more of the following performance parameters: the number of reading and writing operations per second (IOPS) of the storage node, the throughput of the storage node, CPU usage of the storage node, memory usage of the storage node, and the storage space usage of the storage area managed by the storage node.

In an embodiment, each node may periodically monitor its own performance parameters, periodically query data of other nodes at the same time, then dynamically generate a globally unified rebalancing scheme through a predefined rebalancing scheme or through an algorithm, and finally implement the scheme by each node. In another embodiment, the storage system includes a monitoring node that is independent of the storage node S1, the storage node S2, and the storage node S3, the foregoing storage control node or the storage allocation module, in order to monitor performance parameters of each storage node.

In an embodiment, the determination of the unbalanced may be achieved by a predefined threshold (configurable), such as triggering a rebalancing mechanism when the deviation of the number of IOPS between the respective nodes exceeds a certain range. For example, in the case of IOPS, the IOPS value of the storage node with the maximum IOPS value may be compared with the IOPS value of the storage node with the minimum IOPS value, when it is determined that the deviation between the two is greater than 30% of the latter, the storage area adjustment is triggered. For example, a storage medium managed by the storage node with the maximum IOPS value is exchanged with a storage medium managed by a storage node with the minimum IOPS value, for example, a storage node with the maximum IOPS which manages the storage area with the highest storage space usage may be chosen, and a storage node with the minimum IOPS which manages the storage area with the highest storage space usage may be chosen. Optionally, the IOPS value of the storage node with the maximum IOPS value may be compared with the average value of the IOPS value of each storage node, and when it is determined that the deviation between the two is greater than 20% of the latter, the storage area adjustment is triggered, so that the storage area allocation scheme which has been adjusted may not trigger rebalancing immediately.

It should be understood that the foregoing predetermined thresholds 20% or 30% for representing the unbalanced state of the load are merely exemplary, and additional thresholds may be defined depending on different applications and different requirements. Similarly, for other performance parameters, such as the throughput of the storage node, the CPU usage of the storage node, the memory usage of the storage node, and the storage space usage of the storage area managed by the storage node, a predefined definition is also used to trigger the threshold for the load to be rebalanced between the storage nodes.

It should also be understood that although the predetermined threshold for the unbalanced determination discussed above may by determined by one of respective specified thresholds of a plurality of the performance parameters, such as IOPS value, the inventors envisioned that the predetermined threshold may be determined by a combination of multiple specified thresholds of the respective specified thresholds of a plurality of the performance parameters. For example, load rebalancing of a storage node is triggered when the IOPS value of the storage node reaches its specified threshold and the throughput value of the storage node reaches its specified threshold.

In an embodiment, for the adjustment (rebalancing) of the storage area, the storage mediums managed by the storage node with high load may be allocated to the storage areas managed by the storage node with low load, for example, exchanging of storage mediums, deleting in the storage areas managed by a storage node with a high load and adding in the storage areas managed by a storage node with a low load, evenly adding a new storage medium or a new storage area accessed to the storage network to at least two storage areas (for example, storage system expansion), or merging a part of at least two storage areas (for example, a storage node failure) may be included.

In an embodiment, for the adjustment (rebalancing) of the storage areas, a dynamic algorithm may be developed, for example, various load data of each storage medium and each storage node is weighted to obtain a single load indicator, and then a rebalancing solution is calculated, by moving the minimum number of disk groups, so that the system no longer exceeds the predetermined threshold.

In an embodiment, each storage node may periodically monitor the performance parameters of the storage medium managed by itself, and periodically query the performance parameters of the storage medium managed by other storage nodes, and a threshold for indicating the unbalanced state of the load for performance parameters of the storage medium is defined, for example, the threshold may represent the storage space usage rate of any storage medium (a new disk adds) is 0%, the storage space usage rate of any storage medium (the disk space will be full) is 90%, or the difference of the storage medium with the highest storage space usage rate in the storage system and the storage medium with the lowest storage space usage rate is greater than 20% of the latter. It should be understood that the aforementioned predetermined thresholds 0%, 90% and 30% for indicating the unbalanced state of the load are also merely exemplary.

Figure 11:
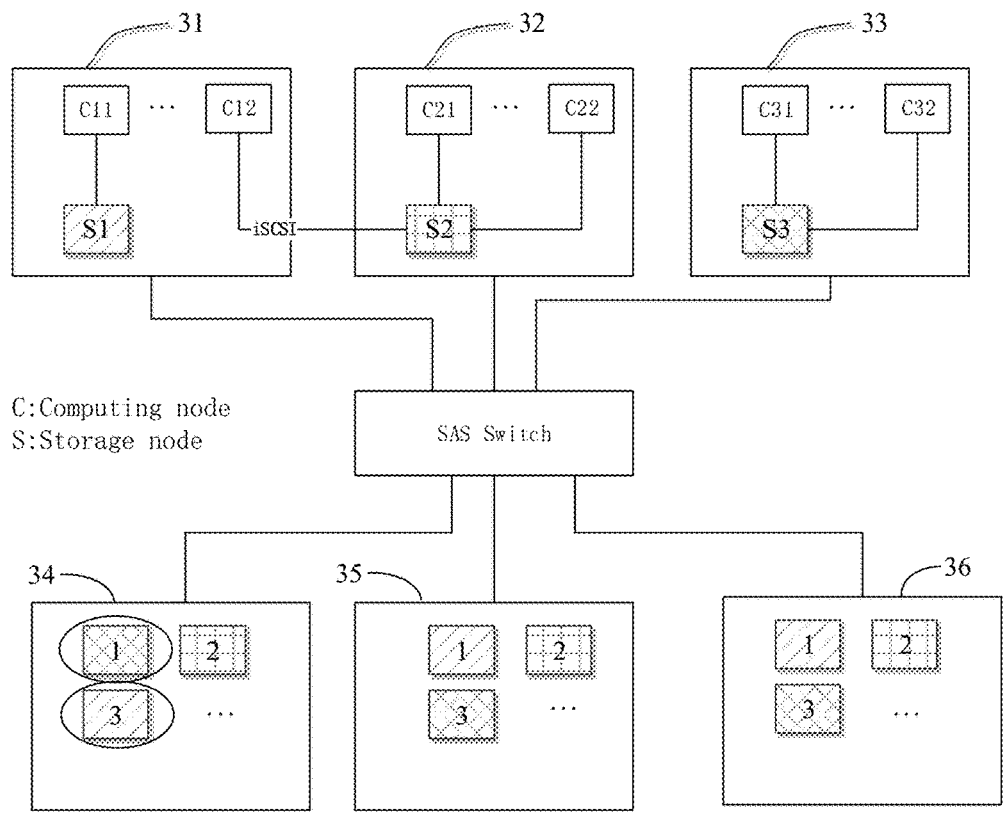
FIG. 11 shows an architectural schematic diagram to achieve load rebalancing in the storage system shown in FIG. 4 according to an embodiment of the present invention.

FIG. 11 shows an architectural schematic diagram to achieve load rebalancing in the storage system shown in FIG. 4 according to an embodiment of the present invention. Suppose that at a certain time, the load of the storage node S1 in the storage system is very high, the storage mediums managed by the storage node S1 include a storage medium 1 located at the storage device 34, a storage medium 1 located at the storage device 35, and a storage medium 1 located at the storage device 36 (as shown in FIG. 4), and the total storage space of the storage node S1 will soon be used up, and the load of the storage node 3 is very low, and the storage space in the storage medium managed by the storage node 3 is large.

In a conventional storage network, each storage node may only access the storage areas that are directly connected to itself. Therefore, during the rebalancing process, the data in a heavy-load storage node needs to be copied to a light-load storage node. In this process, there are a large number of data copy operations, which will cause additional load to the storage area and the network, affecting IO access of normal business data. For example, data in one or more storage mediums managed by the storage node 1 are read, then the data is written into one or more storage mediums managed by the storage node 3, and finally the disk space for saving the data in the storage mediums managed by the storage node 1 is released, so that the load balancing is achieved.

However, according to an embodiment of the present invention, since the storage nodes S1, S2, and S3 included in the storage system may access all the storage areas through the storage network, and therefore, the migration of storage areas between storage nodes may be achieved by the means of moving the access right of storage medium, that is, the storage areas managed by a relevant storage node may be regrouped. During the rebalancing process, the data in each storage area no longer need to be copied. For example, as shown in FIG. 11, the storage medium 2, which is previously managed by the storage node 3 and located at the storage device 34, is allocated to the storage node 1 for management, and the storage medium 1, which is previously managed by the storage node 1 and located at the storage device 34, is allocated to the storage node 3 for management, in this way, the load balancing of the remaining storage space between the storage node 1 and the storage node 3 is achieved.

Figure 12:
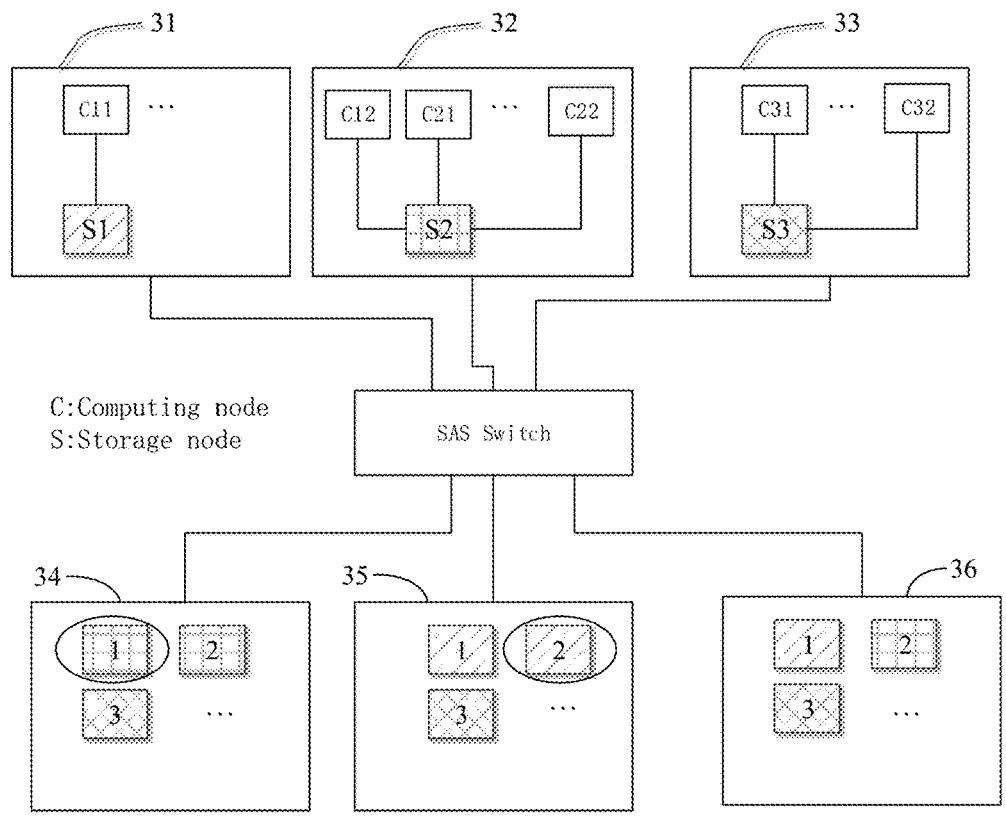
FIG. 12 shows an architectural schematic diagram to achieve load rebalancing in the storage system shown in FIG. 4 according to another embodiment of the present invention.

FIG. 12 shows an architectural schematic diagram to achieve load rebalancing in the storage system shown in FIG. 4 according to another embodiment of the present invention. In FIG. 12, unlike FIG. 11, when it is detected that the load of the storage node S1 is higher and the load of the storage node S2 is lower, the storage medium 2 which is previously managed by the storage node 2 and located at the storage device 35 may be allocated to the storage node 1 for management, and the storage medium 1 which is previously managed by the storage node 1 and located at the storage device 34 may be allocated to the storage node 2 for management, in this way, the load balancing of the remaining storage space between the storage node 1 and the storage node 2 is achieved.

In another embodiment, when the expansion of storage medium is detected, for example, the newly added storage mediums can be allocated equally to each storage node and managed by it, such as by the added order, to maintain the load rebalancing between the storage nodes.

It should be understood that although the above two embodiments take an example of achieving load rebalancing by adjusting storage mediums between different storage nodes, the above two embodiments may also be applied to adjusting storage areas between storage nodes to achieve load rebalancing, for example, in the case of the storage medium expansion, when it is detected that storage areas are added, the added storage areas may be allocated to each storage node in addition order.

Additionally, as shown in FIG. 11 and FIG. 12, when it is detected that the load of the storage node S1 is already high, the configuration between computing nodes and storage nodes in the storage system may also be modified, so that one or more computing nodes, such as the computing node C12, that originally save data through the storage node S1, may save data through another storage node, such as the storage node S2. At this point, a computing node may access a storage node on the physical server where the computing node is located to save data, the computing node may not be physically migrated, and access the storage areas on the remote storage node through remote access protocols, such as iSCSI protocol (as shown in FIG. 11); or, a computing node may be migrated (as shown in FIG. 12) while the storage areas managed by the relevant storage node is adjusted, and the computing node that is to be migrated may need to be closed in the process.

It should be understood that the number of storage nodes, storage devices, storage medium and storage areas included in the storage system discussed above is only schematic with reference to FIG. 4, FIG. 8, FIG. 10, FIG. 11 and FIG. 10, according to an embodiment of the present invention, a storage system may include at least two storage nodes, a storage network, and at least one storage device connected to the at least two storage nodes through the storage network, each of the storage devices can include at least one storage medium, and the storage network can be configured to enable each storage node to access all the storage medium without passing through the other storage nodes.

Figure 13:
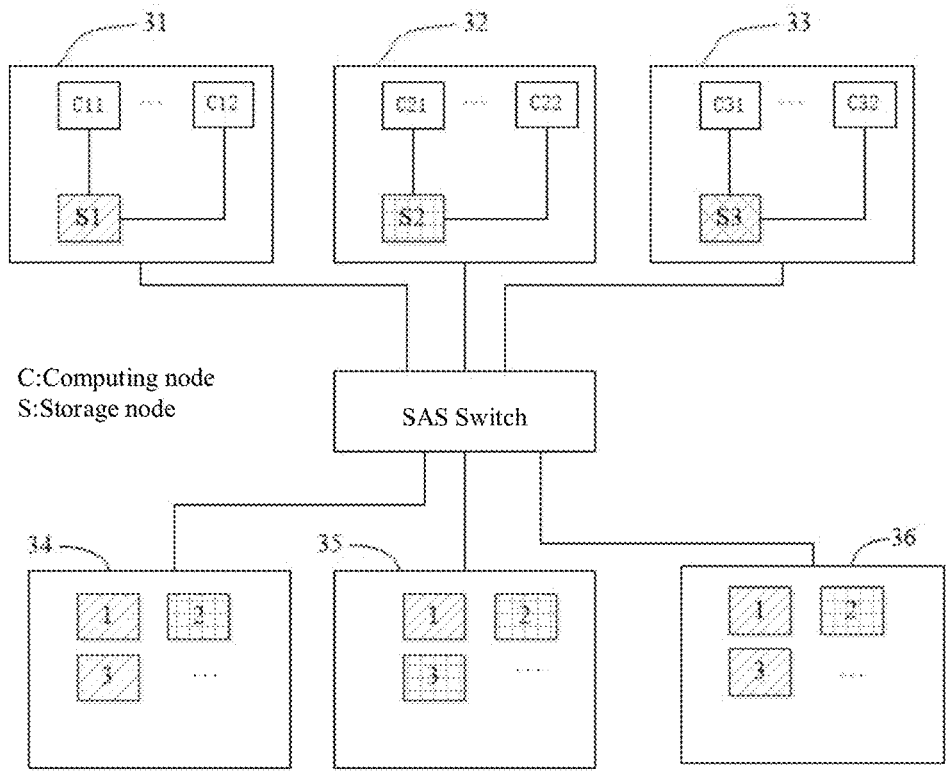
FIG. 13 shows an architectural schematic diagram of a situation where a storage node fails in the storage system shown in FIG. 4 according to an embodiment of the present invention.

FIG. 13 shows an architectural schematic diagram of a situation where a storage node fails in the storage system shown in FIG. 4 according to an embodiment of the present invention. FIG. 13 shows the case that the storage node S3 fails. When the storage node S3 fails, the storage mediums previously managed by the storage node S3 may be taken over by the other storage nodes. FIG. 13 using different background patterns schematically shows the case that the storage mediums previously managed by the storage node S3 are taken over by the storage node S1 and the storage node S2. That is, the storage medium 3 included in the storage device 34 and the storage device 36 is taken over by the storage node S1, and the storage medium 3 included in the storage device 35 is taken over by the storage node S2. The computing node C can access data in the various storage mediums included in the storage devices 34, 35, and 36 through the remaining two storage nodes, namely the storage node S1 and the storage node S2.

It should be understood that the number of storage nodes, storage devices and storage medium included in the storage system discussed above with reference to FIG. 13 and FIG. 4 is only schematic, according to an embodiment of the present invention, a storage system may include at least two storage nodes, a storage network and at least one storage device connected to the at least two storage nodes through the storage network, each of the storage devices can include at least one storage medium, and the storage network can be configured to enable each storage node to access all the storage mediums without passing through the other storage nodes.

Figure 14:
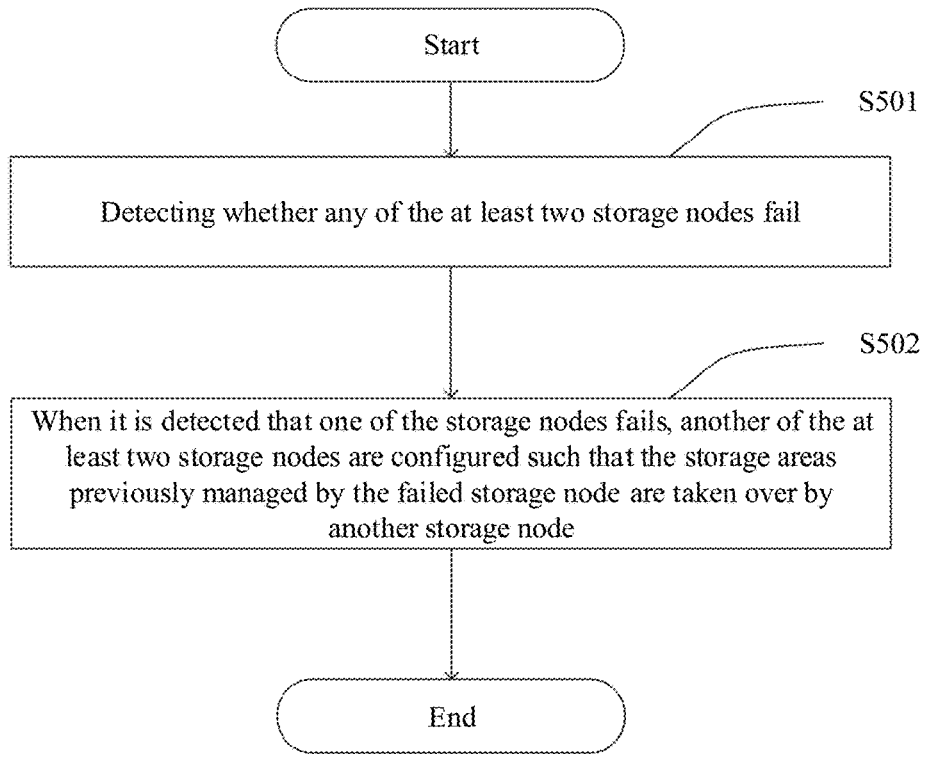
FIG. 14 shows a flowchart of an access control method for a storage system according to an embodiment of the present invention.

FIG. 14 shows a flowchart of an access control method for a storage system according to an embodiment of the present invention.

Step 501, detecting whether there is one or more storage node in the at least two storage nodes fails. The reachability of each storage node can be detected in real time.

Step 502, when a failed storage node is detected, at least one of the other storage nodes of the at least two storage nodes can be configured to take over the storage areas previously managed by the failed storage node.

Specifically, there may be a storage area list in which storage areas managed by each storage node can be recorded, and the storage area list can be modified to make the relevant storage node take over the storage areas previously managed by the failed storage node. For example, adjustment may be done by modifying the configuration table of the storage areas, and the storage areas managed by each storage node of the at least two storage nodes can be determined according to the configuration table. The adjustment of the configuration table can be performed by the storage control node included in the storage system or by the storage allocation module included in the storage node.

According to an embodiment of the present invention, heartbeat can be detected to judge whether there is a failed storage node in the at least two storage nodes. The heartbeat between each server (computing node and storage node, or storage node and storage node) can be detected to judge whether the other side fails. The heartbeat detection can be achieved in many ways. In an embodiment, for example, the heartbeat detection can be achieved through a TCP connection, where the detect-side sends a data package first, the receive-side automatically replies a data package, and if the detect-side does not receive the response of the receive-side for a long time, the receive-side can be judged to have failed. In an embodiment, for example, the heartbeat detection can be achieved by means of an arbitration block, where both sides write data into different areas of the arbitration block at regular intervals, and read the data written by the other side at regular intervals. If the other side is found to have not written new data for a long time, the other side is judged to have failed. Further, it may be necessary to solve the case of misjudgment, that is, the other side has not failed, and only the heartbeat between the both sides has a problem, for example, the network between the both sides is disconnected. A variety of independent heartbeats are often used to make a comprehensive judgment. For example, the above TCP connection and the arbitration block are used at the same time, and only when both heartbeats determine that the other side has failed, it is considered a true failure.

According to an embodiment of the present invention, each storage area is managed by one of the storage nodes. When a storage node is started, the storage node automatically connects to the storage areas managed by itself, and then import is made, after that is completed, storage services may be provided to the upper computing nodes.

When a load unbalanced state is detected between storage nodes, storage areas to be migrated in a storage node with the higher load and storage nodes to which the storage areas migrate need to be determined.

The storage areas needed to be migrated can be determined by many ways of implementation. In an embodiment, the storage areas needed to be migrated can be manually judged by the manager. In an embodiment, configuration files can be used, that is, the migration priority of each storage area should be configured in advance, and when the migration is needed, one or more storage blocks, storage groups, or storage mediums in the storage areas managed by the storage node which are in the highest priority are selected to be migrated. In an embodiment, the migration can be performed according to the load of a storage block, a storage group or a storage medium included in a storage area. For example, the load of a storage block, a storage group or a storage medium included in the storage area managed by each storage node can be monitored by each storage node, for example, the information such as IOPS, throughput, IO latency, and so on can be collected, and all the information can be weighted together, so that the storage areas needed to be migrated can be selected.

The storage nodes to which the storage areas migrate can be determined by many ways of implementation. In an embodiment, the storage nodes can be manually judged by the manager. In an embodiment, configuration files can be used, that is, a migration target list of each storage area should be configured in advance, such as a list in which the storage nodes may be arranged according to the priority of the storage node, and when a storage area (or part) is needed to be migrated, the migration destinations can be selected in turn according to the list. It should be noted that, when the storage nodes are determined by this way, the target storage node is not overloaded after migration that should be ensured.

When it is detected that a storage node fails, there is need to determine the storage node to which the storage areas managed by the failed storage node migrate, that is, the storage node which takes over the storage areas. The storage nodes to which the storage areas migrate can be determined by many ways of implementation.

In an embodiment, the storage nodes to which the storage areas migrate may be manually judged by the manager.

In an embodiment, configuration files can be used, that is, a migration target list of each storage area should be configured in advance, such as a list in which the storages nodes may be arranged according to the priority of the storage node, and when it is determined that a storage area (or part) is needed to be migrated, the migration destinations can be selected in turn according to the list. It should be noted that, when the storage nodes are determined by this way, the target storage node is not overloaded after migration that should be ensured. Optionally, a hot standby storage node can be set up, and none storage area is managed by the hot standby storage node normally, that is, the hot standby storage node is not loaded. Once any storage node fails, the storage areas managed previously by the failed storage node can be migrated to the hot standby storage node.

In an embodiment, a storage node to be migrated can be selected according to the load of each storage node, and the load of each storage node can be monitored, for example, the information such as CPU usage rate, memory usage rate, network bandwidth usage rate, and so on can be collected, and all the information can be weighted together, so that the storage areas needed to be migrated can be selected. For example, the load of each node can be reported by each storage node itself to the other storage nodes periodically or irregularly, and when migration is needed, a storage node with the lowest load can be selected by the storage node in which data needs to migrate as the target storage node for migration.

Optionally, when the failed storage node is resaved, the storage areas taken over by other storage nodes need to migrate back, and under this case, the storage areas which are needed to migrate and the target storage node are known (for example, each migration process can be recorded in the above configuration files), and there is only need to resave the storage areas originally managed by the failed storage node.

The migration process can be determined and started by the storage system administrator, or it can be started by a program. In the specific migration process, namely the takeover process, firstly, it is to ensure that the two storage nodes involved are no longer running, to avoid data corruption caused by the two storage nodes accessing the same storage area at the same time, for example, specifically, the power of the opposite side can be forcibly closed through the IPMI interface. Then the storage areas need to be initialized by the target storage node, to repair the inconsistent data (if it exists), and finally the upper application should be notified to access the storage areas taken over by the target storage node through the target storage node.

After determining the storage area (or part thereof) to be migrated and the target storage node to which the management rights are migrated, the storage system administrator can determine and start the specific migration process, or the migration process can be started by a program. It should be noted that the impact caused by the migration process to the upper computing nodes needs to be reduced, for example, the time that the application load is minimal can be selected to perform the migration process, or the migration operation is performed at midnight (assuming load is minimal at this time); when the computing node needs to be closed during the migration process, it should be done as far as possible when the utilization of the computing node is low. The migration strategy should be configured previously, so that when many storage areas or many parts of a storage area need to be migrated, migration order and concurrent quantity can be controlled. While the migration process of the storage area is started, the writing or reading operations of the relevant storage area corresponding to the relevant storage node can be configured, so that the integrity of the data can be ensured, for example, all cache data can be written into disks; after the storage area migrates to the target storage node, the storage area needs to be initialized by the target storage node, and then the storage area can be accessed by the upper computing node; after the migration process is completed, the load status should be monitored again to determine whether the load is balancing.

Further, the storage node without storage areas managed currently by itself can be selected to take over the storage areas managed by the failed storage node. Optionally, the storage areas to be taken over by each takeover storage node can be distributed follow the principle of equal distribution, or the storage areas to be taken over by each takeover storage node can be distributed according to the level of the load.

In an embodiment, part or all of the other storage nodes of the at least two storage nodes may be configured, so that the storage areas previously managed by the failed storage node may be taken over by them. For example, storage areas managed by the failed storage node may be taken over by one of the other storage nodes, or by at least two storage nodes of the other storage nodes, wherein a part of the storage areas managed by the failed storage node can be taken over by each storage node.

As mentioned earlier, the system may include a storage control node, connected to the network, adapted for allocating storage areas to the at least two storage nodes; or, the storage node may also include a storage allocation module, adapted for determining the storage areas managed by the storage node, and data can be shared between the storage allocation modules.

In an embodiment, a storage control node or a storage allocation module records a storage area list in which storage areas for which each storage node is responsible can be recorded. After the storage node starts up, it queries the storage control node or the storage allocation module for the storage areas managed by itself, and then scans these storage areas to complete the initialization. When it is determined that storage area migration is required, the storage control node or the storage allocation module modifies the storage area list, storage areas of a relevant storage node may be modified, and then notifies the storage node to complete the actual handover work as required.

For example, assuming that a storage area 1 needs to be migrated from a storage node A to a storage node B in an SAS storage system 30, the migration process may include the following steps:

1) deleting the storage area 1 from a storage area list of the storage node A;

2) forcibly flushing all cache data into the storage area 1 on the storage node A;

3) closing (or resetting) SAS links between the storage node A and all storage mediums in the storage area 1 by SAS instructions on the storage node A;

4) adding the storage area 1 to a storage area list on the storage node B;

5) opening (or resetting) SAS links between the storage node B and all storage medium in the storage area 1 by SAS instructions on the storage node B;

6) the storage node B scanning all storage mediums in the storage area 1 to complete initialization; and 7) an application accessing data in the storage area 1 through the storage node B.

It should be noted that although the method described in the present invention has been shown and described as a series of actions for the purpose of simplifying the description, it should be understood and appreciated that the claimed subject matter will not be limited by the order in which these actions are performed, as some actions may occur in a different order from that shown and described herein or in parallel with other actions, while some actions may also include several sub-steps, and the possibility of sequential cross-execution may occur between these sub-steps. In addition, not all illustrated actions may be necessary to implement the method in accordance with the appended claims. Furthermore, the description of the foregoing steps does not exclude that the method may also include additional steps that may achieve additional effects. It should also be understood that the method steps described in different embodiments or flows may be combined or substituted with each other.

Figure 15:
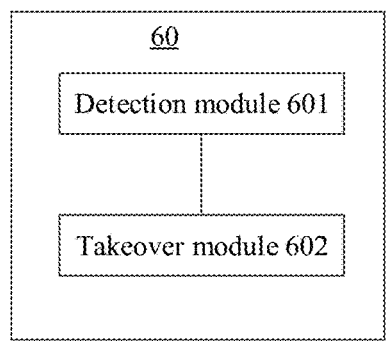
FIG. 15 shows a block diagram of an access control apparatus of a storage system according to an embodiment of the present invention.

FIG. 15 shows a block diagram of an access control apparatus of a storage system according to an embodiment of the present invention. The access control apparatus 60 may include: a detection module 601, adapted for detecting whether any of at least two storage nodes fails; and a takeover module 602, adapted for configuring other storage nodes of the at least two storage nodes to take over storage areas previously managed by the failed storage node through other storage nodes when it is detected that a storage node fails.

It should be understood that each module described in the apparatus 60 corresponds to each step in the method 51 described with reference to FIG. 14. Therefore, the above operations and features described in FIG. 14 are also applicable to the apparatus 60 and the modules included therein, and repeated contents will not be described herein.

According to an embodiment of the present invention, the apparatus 60 may be implemented at each storage node or in a scheduling device of a plurality of storage nodes.

According to an embodiment of the present invention, in the case where a storage node fails, the application can still normally access the data in the storage areas managed by the storage node, and there will be no problem that the storage mediums are inaccessible. In further cases, there will be no performance degradation due to a decrease in the number of available disks.

Figure 16:
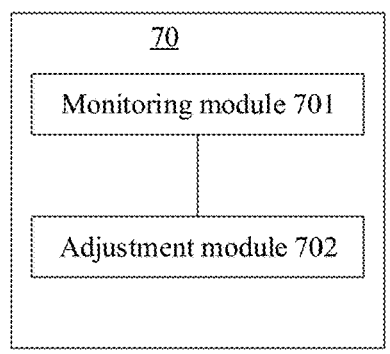
FIG. 16 shows a block diagram of a load rebalancing apparatus for a storage system according to an embodiment of the present invention.

FIG. 16 shows a block diagram of a load rebalancing apparatus for a storage system according to an embodiment of the present invention. The load rebalancing apparatus 70 may include: a monitoring module 701, adapted for monitoring a load status between the at least two storage nodes; and an adjustment module 702, adapted for adjusting storage areas managed by relevant storage nodes of the at least two storage nodes if an unbalanced status of the load is detected to exceed a predetermined threshold.

It should be understood that each module described in the apparatus 70 corresponds to each step in the method 41 described with reference to FIG. 10. Therefore, the above operations and features described in FIG. 10 are also applicable to the apparatus 70 and the modules included therein, and repeated contents will not be described herein.

According to an embodiment of the present invention, the apparatus 70 may be implemented at each storage node or in a scheduling device of a plurality of storage nodes.

Furthermore, in the conventional storage system, when data is written by a user, the data may be evenly distributed to the storage nodes, and the storage node load and the data occupation are relatively balanced. However, in the following cases, data unbalanced will occur:

(1) due to data distribution algorithm and characteristics of user data itself, the data cannot be evenly distributed to different storage nodes, which shows that some storage nodes have high load and some storage nodes have low load;

(2) capacity expansion: capacity expansion is generally achieved by adding new nodes, and at this time the load of newly added storage nodes is 0. A part of the data of the existing storage nodes must be physically migrated to the expansion nodes to achieve load rebalancing between the storage nodes.

Figure 17:
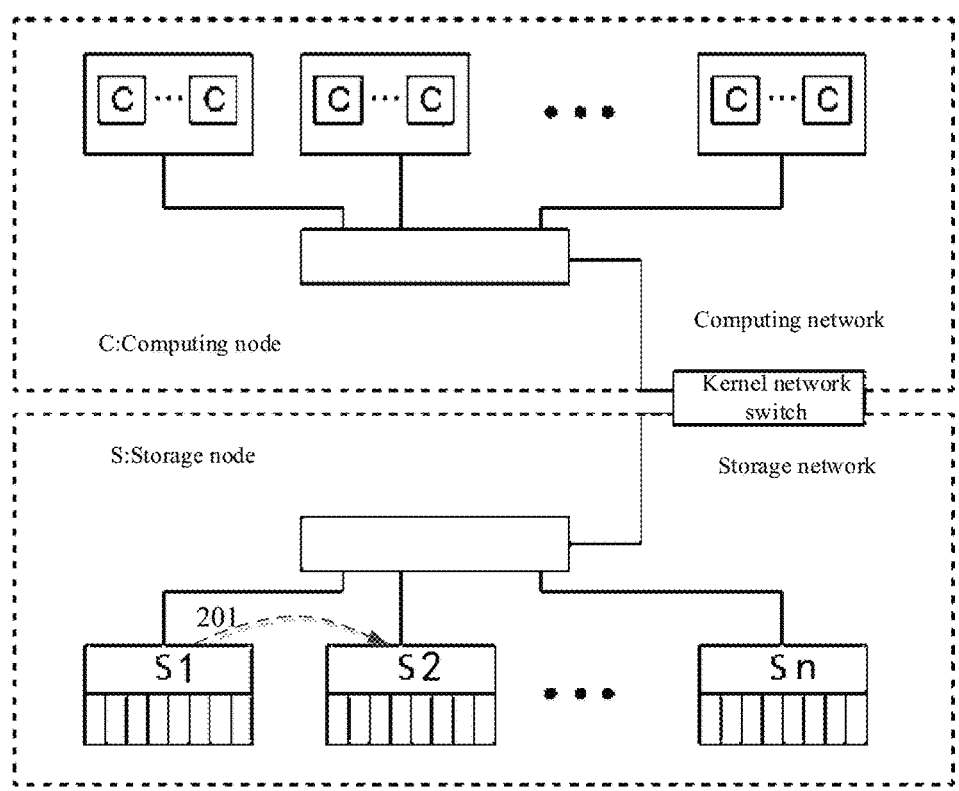
FIG. 17 shows an architectural schematic diagram of data migration in the process of achieving load rebalancing between storage nodes in a conventional storage system based on a TCP/IP network.

FIG. 17 shows an architectural schematic diagram of data migration in the process of achieving load rebalancing between storage nodes in a conventional storage system based on a TCP/IP network. In this exemplary embodiment, a part of the data saved in storage node S1 with higher load is migrated to storage node S2 with lower load, which specifically relates to data migration between the storage mediums of the two storage nodes, as shown by dashed arrow 201. It can be seen that in the process of achieving the load rebalancing between the storage nodes of the TCP/IP network, a large amount of disk read-write performance and network bandwidth will be occupied, which affects the read-write performance of normal business data.

According to the embodiments of the present invention, a storage node load rebalancing scheme supporting the data migration between storage mediums or storage areas is provided, the rebalancing is directly achieved by reallocating control of storage mediums or storage areas between the storage nodes, which avoids the influence on the normal business data in the migration process and significantly improves the efficiency of the storage node load rebalancing.

An embodiment of the invention also provides a redundant storage method, and a storage system applicable to the method includes: a storage network; at least two storage nodes connected to the storage network; and at least two storage devices connected to the storage network, each storage device including at least one storage medium; wherein each storage node accesses the at least two storage devices through the storage network. The method includes: saving data in the redundant storage mode between at least one storage block of each of at least two storage devices accessed by the same storage node, wherein the storage block is a complete storage medium or a part of a storage medium.

In an embodiment of the present invention, all storage mediums in the storage system constitute a storage pool, and the storage pool is a global storage pool as described above, that is, all storage mediums in the storage pool can be shared by all storage nodes in the storage system, and each storage node can access all storage mediums in the storage pool without passing through other storage nodes.

Specifically, the redundant storage method based on the global storage pool can be achieved by the following steps: selecting a plurality of storage devices from the storage pool first, then selecting at least one storage block from each of the selected plurality of storage devices, and aggregating all storage blocks selected through the above steps into a storage group. In this way, in the storage group, data is saved in all storage blocks of the storage group in redundant storage. When a storage block in the storage group fails, the data in the failed storage block can be obtained by using the data in other storage blocks in the storage group.

It should be understood that the storage blocks in a storage group do not necessarily come from all the storage devices in the storage pool, and the storage devices in the storage pool are not necessarily all used for redundant storage. For storage devices and storage blocks that are not selected for redundant storage, they can be used as hot standby devices that are not normally used.

It should be understood that the mode of redundant storage between storage blocks in the storage group may be specifically implemented by a multi-copy mode, a redundant arrays of independent disks (RAID) or an erasure code mode, and the specific mode of redundant storage between the storage blocks in the storage group is not limited by the present invention.

In an embodiment of the present invention, in order to satisfy more flexible storage settings according to specific saved contents, a plurality of storage groups may also be aggregated into a storage area.

As mentioned earlier, since the storage blocks in the storage group actually come from different storage devices, the fault tolerance level of the storage pool is related to the fault tolerance level of the redundant storage in the storage group, so the fault tolerance level of the storage pool can be adjusted by adjusting the number of storage blocks allowed to fail simultaneously in the storage group and/or the number of storage blocks selected from at the least two storage devices of the storage pool for aggregation into the same storage group. The specific adjustment manner can be the same as the method performed by the fault tolerance level adjustment module in the aforementioned storage system, and details are not described herein again.

Therefore, in the redundant storage method applied to the storage system according to the embodiment of the present invention, different fault tolerance levels of the storage pool can be achieved by adjusting the fault tolerance level of the storage group and the selection strategy of the storage blocks in the storage group, so as to adapt to different levels of actual storage requirements.

Figure 18:
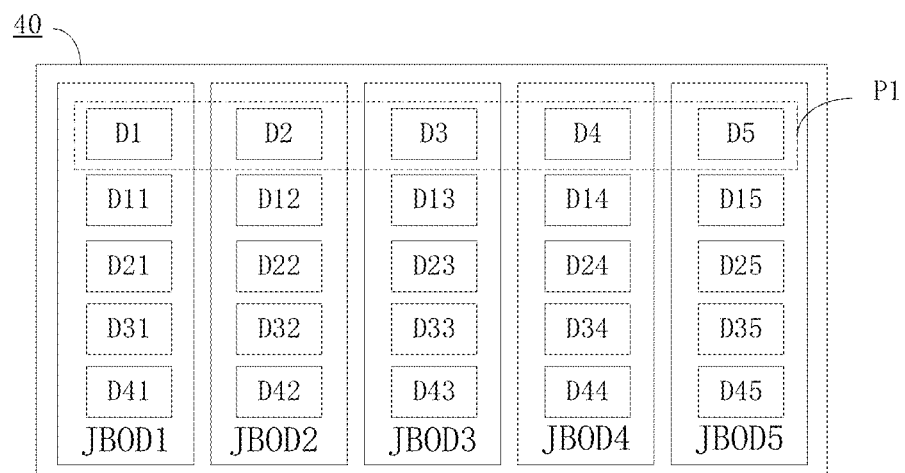
FIG. 18 is a schematic structural diagram of a storage pool using redundant storage according to an embodiment of the present invention.

FIG. 18 is a schematic structural diagram of a storage pool using redundant storage according to an embodiment of the present invention. As shown in FIG. 18, the storage pool 40 includes five storage devices JBOD1~JBOD5, and each storage device includes five storage blocks. The five storage devices JBOD1~JBOD5 in the storage pool 40 are all used for redundant storage, and one storage block selected from each storage device are aggregated into a storage group in an erasure code mode. For example, the storage blocks D1~D5 are aggregated into a storage group P1, and D11~D15 may be aggregated into another storage group. In the storage group P1, data is saved in the storage blocks D1~D5 in an erasure code mode, and the check level of erasure code is 2, that is, the number of storage blocks allowed to fail simultaneously in the storage group P1 is 2, and the number of storage devices allowed to fail simultaneously in the storage pool 40 is also 2.

Figure 19:
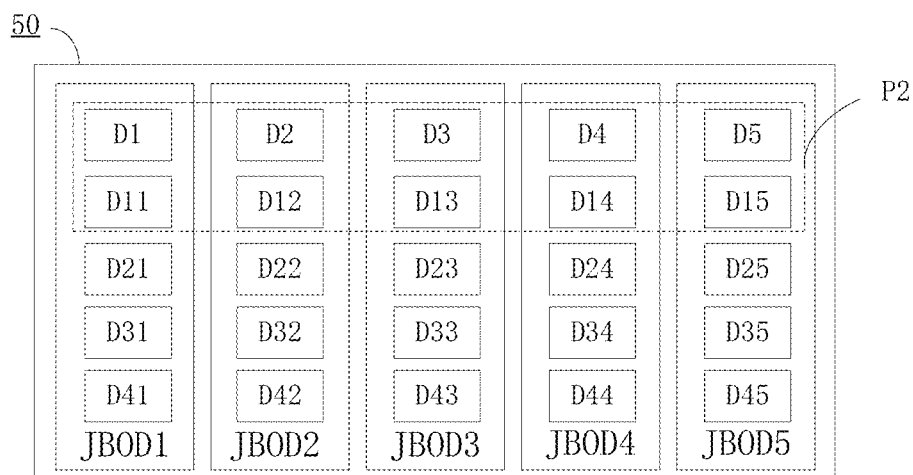
FIG. 19 is a schematic structural diagram of a storage pool using redundant storage according to another embodiment of the present invention.

FIG. 19 is a schematic structural diagram of a storage pool using redundant storage according to another embodiment of the present invention. As shown in FIG. 19, five storage devices JBOD1~JBOD5 in the storage pool 50 are also used for redundant storage, but two storage blocks selected from each storage device are aggregated into a storage group in an erasure code mode. For example, storage blocks D1~D15 are aggregated into storage group P2, and storage blocks D21~D35 may be aggregated into another storage group. In the storage group P2, the check level of erasure code is 3, that is, the number of storage blocks allowed to fail simultaneously in the storage group P2 is 3, and the number of storage devices allowed to fail simultaneously in the storage pool 50 is 3/2, taking the integer of 3/2 is 1, that is, the number of storage devices allowed to fail simultaneously in the storage pool 50 is only one.

An embodiment of the invention also provides a redundant storage apparatus, and a storage system applicable to the apparatus includes: a storage network; at least two storage nodes connected to the storage network; and at least two storage devices connected to the storage network, each storage device including at least one storage medium; wherein each storage node accesses the at least two storage devices through the storage network. The redundant storage apparatus includes: a redundant storage module, adapted for saving data in a redundant mode between at least one storage block of each of at least two storage devices accessed by the same storage node, wherein the storage block is a complete storage medium or a part of the storage medium. It should be understood that the method performed by the redundant storage module is the same as the foregoing redundant storage method, the functional effects that can be achieved are also the same, and details are not described herein again.

In an embodiment of the present invention, each server can be monitored for failure by the following manners: dividing the global storage pool into at least two storage areas and selecting one storage area from the at least two storage areas as a global arbitration disk. Each storage node is able to read and write the global arbitration disk, but is only responsible for managing zero to multiple storage areas in the remaining storage areas (except the storage area where the global arbitration disk is located).

According to the embodiments of the present invention, the global arbitration disk is used by the upper application of the server, namely the storage node, that is, each storage node can directly read and write the global arbitration disk. Due to the multi-nodes control of storage access, each storage node can synchronously read contents updated by other storage nodes.

In an embodiment of the invention, the storage space of the global arbitration disk is divided into at least two fixed partitions, and each of the at least two fixed partitions is respectively allocated to each storage node of the one or more storage nodes, so that the concurrent read-write conflict of the plurality of storage nodes to the arbitration disk can be avoided.

In an embodiment of the present invention, the global arbitration disk may be configured that when the global arbitration disk is used, each of the one or more storage nodes can only perform writing operation to the fixed partitions allocated to itself, and perform reading operation to the fixed partitions allocated to other storage nodes, so that the storage node can update its own states while understanding the state changes of other storage nodes.

In an embodiment of the present invention, an election lock may be set on the global arbitration disk. When one storage node fails, at least one storage node is elected from the other storage nodes by the election lock mechanism to take over the failed storage node. Especially when a storage node has a special function and the storage node with the special function fails, the value of the election lock mechanism is even greater.

Specifically, the global arbitration disk as a storage area may also have the characteristics of the storage area as discussed above. In an embodiment of the present invention, the global arbitration disk includes one or more storage mediums, or part or all of one or more storage mediums. And, the storage mediums included in the global arbitration disk may be located in the same or different storage devices.

For example, the global arbitration disk may be composed of one complete storage medium, two complete storage mediums, a part of two storage mediums, or a part of one storage medium and another or several complete storage mediums.

In an embodiment of the present invention, the global arbitration disk may be composed of all or a part of at least two storage mediums of at least two storage devices in a redundant storage mode.

Taking JBOD as a storage medium as an example, since each storage node server can access all storage resources on the JBODs, some storage spaces can be extracted from one or more disks of each JBOD, and the storage spaces may be combined to use as a global arbitration disk. By controlling the distribution of the arbitration disk, the reliability of the arbitration disk can be easily improved. In the most severe case, when only one JBOD in the system has not failed, the arbitration disk can still work.

In a typical high-availability distributed storage system, physical servers of multiple devices are connected. When one storage server fails, its workload will be taken over by other storage servers. When judging whether a server fails, the method of heartbeat line is commonly used. Two servers are connected by the heartbeat line. If one server cannot receive a heartbeat signal from the other server, the other server is judged to have failed. There are some problems with this method. When the server has not failed and only the heartbeat line fails, a misjudgment will occur. It may even happen that any server is considered that the other fails and both servers grab to take over the other's workload.

The arbitration disk is used to solve the problems. The arbitration disk is the storage space shared by master servers and slave servers. Whether a specific signal can be written into the arbitration disk can be used to judge whether the corresponding server fails or not. However, in fact, this technology does not completely solve the problems. If only the channel to the arbitration disk fails, but the server is still intact, the same problem will still exist.

In the storage system according to the embodiment of the invention, since the storage of computing nodes (virtual machines, containers, etc.) on each physical server is also in the global storage pool, specifically, in the same shared storage pool as the arbitration disk. The normal reading and writing to the global storage pool of the computing nodes and the storage nodes goes through the same storage channel as the reading and writing to the arbitration disk of the storage node. In this case, if a server fails to read and write the arbitration disk, whether the server fails or the related storage channel fails, the computing nodes on the server will certainly not work properly, that is, they cannot access normal storage resources. Therefore, it is very reliable to judge whether the corresponding computing node works effectively through such an arbitration disk structure.

Specifically, each storage node continuously writes data into the arbitration disk. And, each storage node continuously monitors (by reading) whether other storage nodes periodically write data into the arbitration disk. Once it is found that a certain storage node does not write data into the arbitration disk on time, it can be determined that the computing node corresponding to the storage node does not work properly.

The manner in which the storage node continuously writes heartbeat data into the arbitration disk is that the storage node periodically writes the heartbeat data to the arbitrator disk at a time interval preset by the system, for example, the storage node writes the data into the arbitrator disk every five seconds.

The teachings of the present invention may also be embodied as a computer program product of a computer readable storage medium, including computer program code when executed by a processor, which enables the processor to implement the method according to an embodiment of the present invention, such as access control method for the storage system, load rebalancing method for the storage system, redundant storage method of the storage system. The computer storage medium may be any tangible medium, such as a floppy disk, a CD-ROM, a DVD, a hard disk drive or a network medium.

It should be understood that although an implementation form of the embodiments of the present invention described above may be a computer program product, the method or apparatus of the embodiments of the present invention may be implemented in software, hardware, or a combination of software and hardware. The hardware may be implemented by using dedicated logic. The software may be saved in a storage and executed by an appropriate instruction execution system, such as a microprocessor or dedicated design hardware. It will be appreciated by those of ordinary skill in the art that the above-described methods and systems may be implemented using computer-executable instructions and/or control code included in processor, which may be provided in a carrier medium such as a disk, a CD or a DVD-ROM, a programmable storage such as read-only memory (firmware), or a data carrier such as an optical or electrical signal carrier. The methods and systems according to embodiments of the present invention may be implemented by hardware circuits such as very large scale integrated circuits or gate arrays, semiconductors such as logic chips, transistors, or programmable hardware devices such as field programmable gate arrays, programmable logic devices, or be implemented in software executed by various types of processors, or may be implemented by a combination of the above described hardware circuit and software, such as firmware.

It should be understood that although several modules or sub-modules of the apparatus are mentioned in the detailed description herein above, such division is merely exemplary and not compulsory. In fact, features and functions of the two or more modules described above may be implemented in one module. Conversely, the features and functions of one module described above may be further divided into multiple modules.

It should be understood that, in order not to make the embodiments of the present invention ambiguous, only some critical and unnecessary techniques and features are described, and some features that can be achieved by those skilled in the art may not described.

The above description is merely preferable embodiments of the present invention and is not intended to limit the scope of the present invention, any amendment or equivalent replacement, etc., within the spirit and the principle of the present invention, should be covered in the protection scope of the present invention.

What is claimed is:

1. A data storage system, comprising:
    a storage network;
    at least two storage nodes, connected to the storage network; and
    at least one storage device, connected to the storage network, each of the at least one storage device comprising at least one storage medium;
    wherein, the storage network is configured to enable each of the at least two storage nodes to access any of the at least one storage medium without passing through another storage node of the at least two storage nodes;
    all the storage mediums included in the data storage system constitute a storage pool which is divided into at least two storage areas, and each of the storage nodes is responsible for managing zero to multiple of the at least two storage areas and the storage areas managed by different storage nodes are different;
    each of the storage areas comprises at least two storage blocks, and the at least two storage blocks constituting a storage area are divided into one or more storage groups, data is saved in a redundant storage mode between the storage blocks within a storage group, and a storage block is a complete storage medium or a part of a storage medium; wherein the redundant storage mode is to save the data in the storage blocks of different storage devices; and
    in one storage group, the number of the storage blocks located in one same storage device is less than or equal to the fault tolerance level of the redundant storage mode.

2. The data storage system of claim 1, wherein one of the at least two storage areas is chosen as a global arbitration disk.

3. The data storage system of claim 2, wherein the storage space of the global arbitration disk is divided into at least two fixed partitions, each of the at least two fixed partitions being allocated to each of the at least two storage nodes; and each storage node is capable of writing the fixed partition allocated thereto and reading fixed partitions allocated to other storage nodes.

4. The data storage system of claim 2, wherein an election lock is set on the global arbitration disk; and when one of the storage nodes fails, at least one storage node is elected from the other storage nodes by the election lock mechanism to take over the failed storage node.

5. The data storage system of claim 1, wherein the data storage system further comprises a fault tolerance level adjustment module, adapted for adjusting the fault tolerance level of the storage pool by adjusting the redundant storage mode of a storage group and/or adjusting the maximum number of storage blocks that belong to same storage group and located in same storage device of the storage pool.

6. The data storage system of claim 1, wherein the storage network is an SAS storage network or PCI/e storage network or Infiniband storage network or Omni-Path network, the storage network comprising at least one SAS switch or PCI/e switch or Infiniband switch or Omni-Path switch;
    each of the at least one storage device has SAS interface or PCI/e interface or Infiniband interface or Omni-Path interface.

7. The data storage system of claim 6, wherein the data storage system further comprises at least one computing node, each of the storage nodes corresponding to one or more computing nodes of the at least one computing node; and
    each of the at least one computing node is connectable to each of the storage mediums of the at least one storage device by any one of the storage nodes.

8. The data storage system of claim 7, wherein the data storage system further comprises at least two servers, each of the at least two servers comprises one storage node and at least one computing node;
    the computing node is able to access storage medium via storage node, storage network and storage device without TCP/IP protocol; and a computing node is a virtual machine or a container.

9. The data storage system of claim 1, wherein the storage medium comprises at least one high performance storage medium and at least one persistent storage medium;

all or a part of one or more high performance storage mediums of the at least one high performance storage mediums constitute a high cache area; and when data is written by a storage node, the data is first written into the high cache area, and then the data in the high cache area is written into the persistent storage medium by the same or another storage node.

10. The data storage system of claim 9, wherein location of the persistent storage medium into which the data should ultimately be written is recorded into the high cache area while the data is written into the high cache area; and then the data in the high cache area is written into the persistent storage medium by the same or another storage node according to the location of the persistent storage medium into which the data should ultimately be written.

11. The data storage system of claim 10, wherein after the data in the high cache area is written into the persistent storage medium by the same or another storage node, the corresponding data is cleared from the high cache area.

12. A load rebalancing method for a data storage system of claim 1, comprising:
monitoring a load status between the at least two storage nodes; and
when it is detected that load of one storage node exceeds a predetermined threshold, adjusting the storage areas managed by the relevant storage nodes of the at least two storage nodes.

13. The method of claim 12, wherein the data storage system further comprising:
a storage control node, connected to the storage network for allocating storage areas to the at least two storage nodes;
or, each storage node comprising: a storage allocation module, adapted for determining the storage areas managed by the storage node;
a storage area list in which storage areas managed by each of the at least two storage nodes can be recorded is recorded by the storage control node or the storage allocation module, and the adjusting the storage areas managed by the relevant storage node of the at least two storage nodes comprises:
modifying the information of the relevant storage nodes in the storage area list.

14. The method of claim 12, wherein the monitoring a load status between the at least two storage nodes comprises monitoring one or more of the following performance parameters of the at least two storage nodes:
the TOPS of the storage node;
the throughput of the storage node;
CPU usage of the storage node;
memory usage of the storage node;
the storage space usage of the storage areas managed by the storage node;
the predetermined threshold includes a combination of one or more of the respective specified thresholds of the performance parameters.

15. An access control method for a data storage system of claim 1, comprising:
detecting whether any of the at least two storage nodes fails; and
when it is detected that one of the storage nodes fails, at least one of the other storage nodes of the at least two storage nodes are configured to take over the storage areas previously managed by the failed storage node.

16. The method of claim 15, wherein the storage network comprises at least one storage switching device, and the at least two storage nodes and the at least one storage device are connected to the storage switching device through a storage channel, wherein, the storage channel is an SAS channel or a PCI/e channel or a Infiniband channel or a Omni-Path channel, and the storage switching device is an SAS switch or a PCI/e switch or a Infiniband switch or a Omni-Path switch.

17. The method of claim 15, wherein the detecting whether any of the at least two storage nodes fails comprises:
determining whether the storage node fails by detecting heartbeat of the storage node.

* * * * *